March 27, 1962  K. W. TANTLINGER  3,027,025
APPARATUS FOR HANDLING FREIGHT IN TRANSIT
Filed April 8, 1958  18 Sheets-Sheet 1
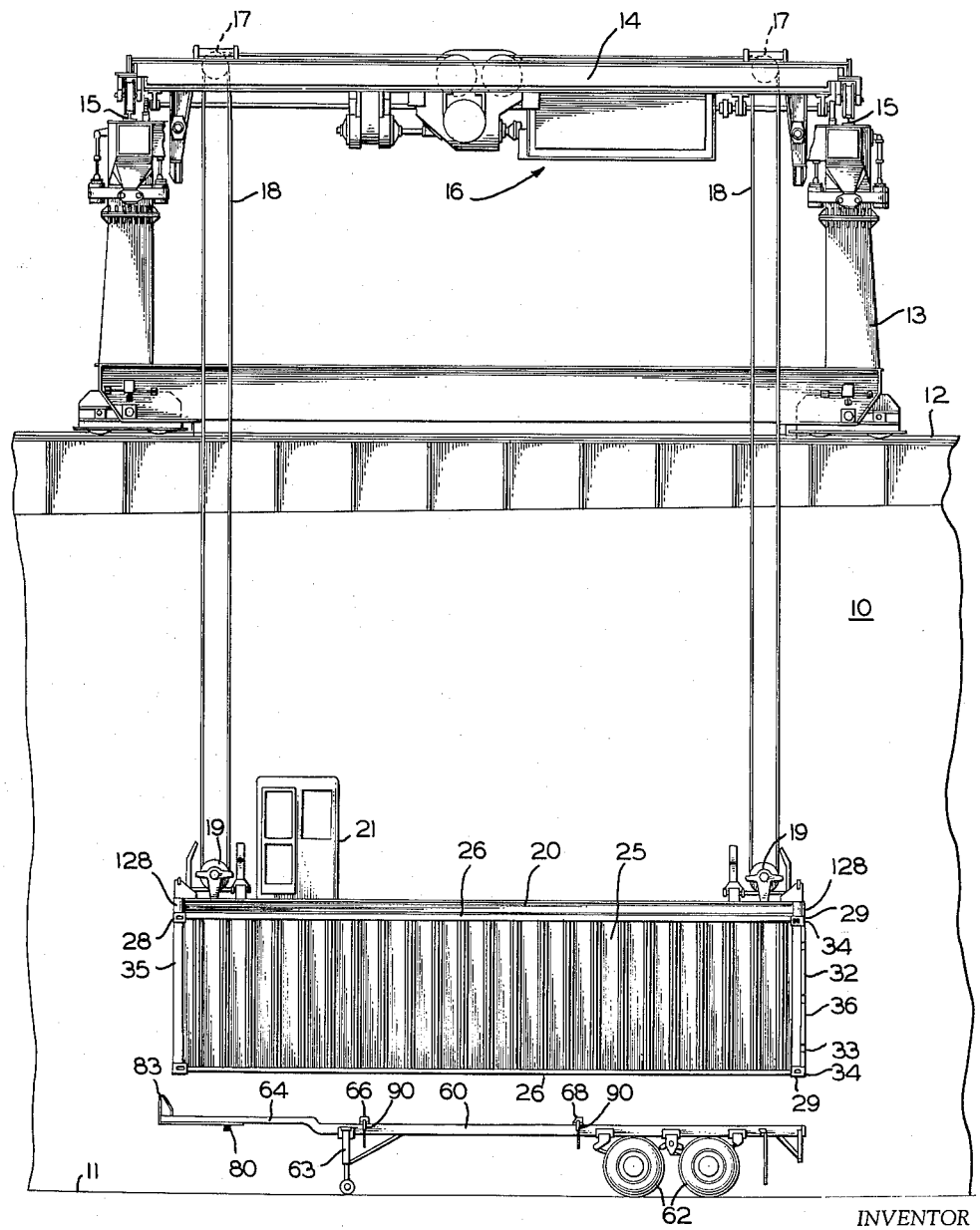
INVENTOR
Keith W. Tantlinger
BY Albert K. Kirchner
ATTORNEY

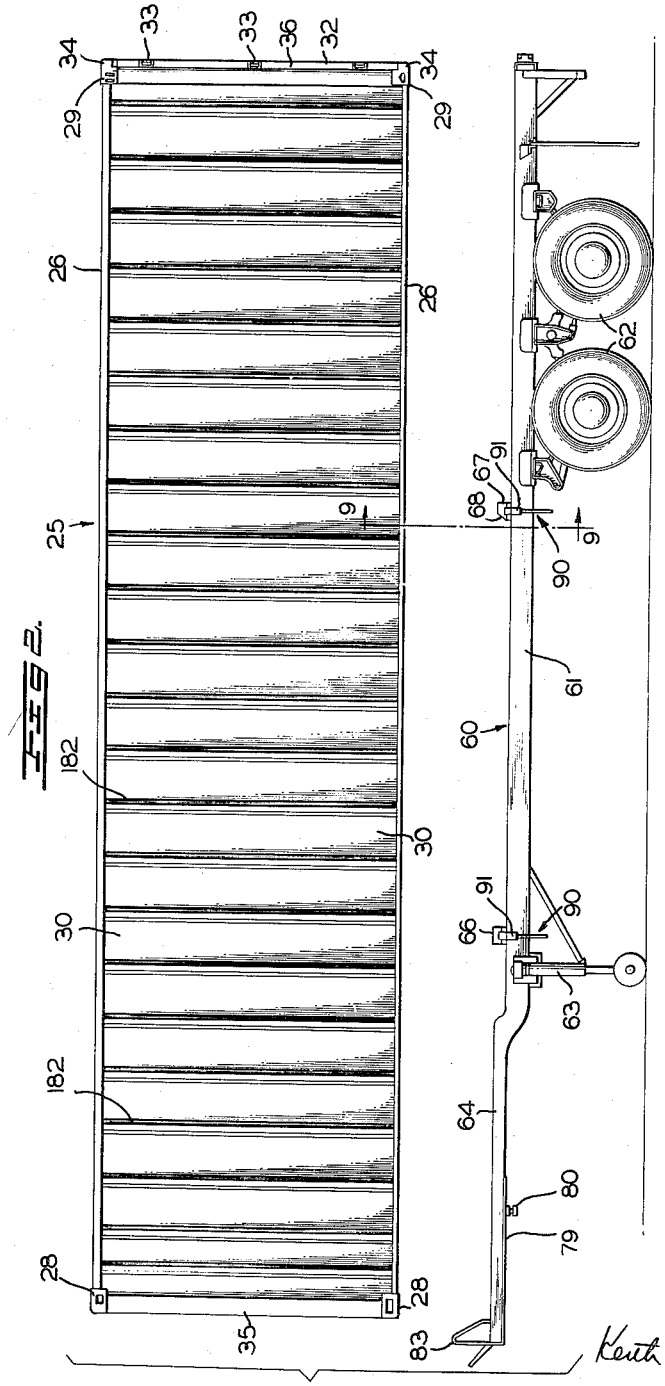

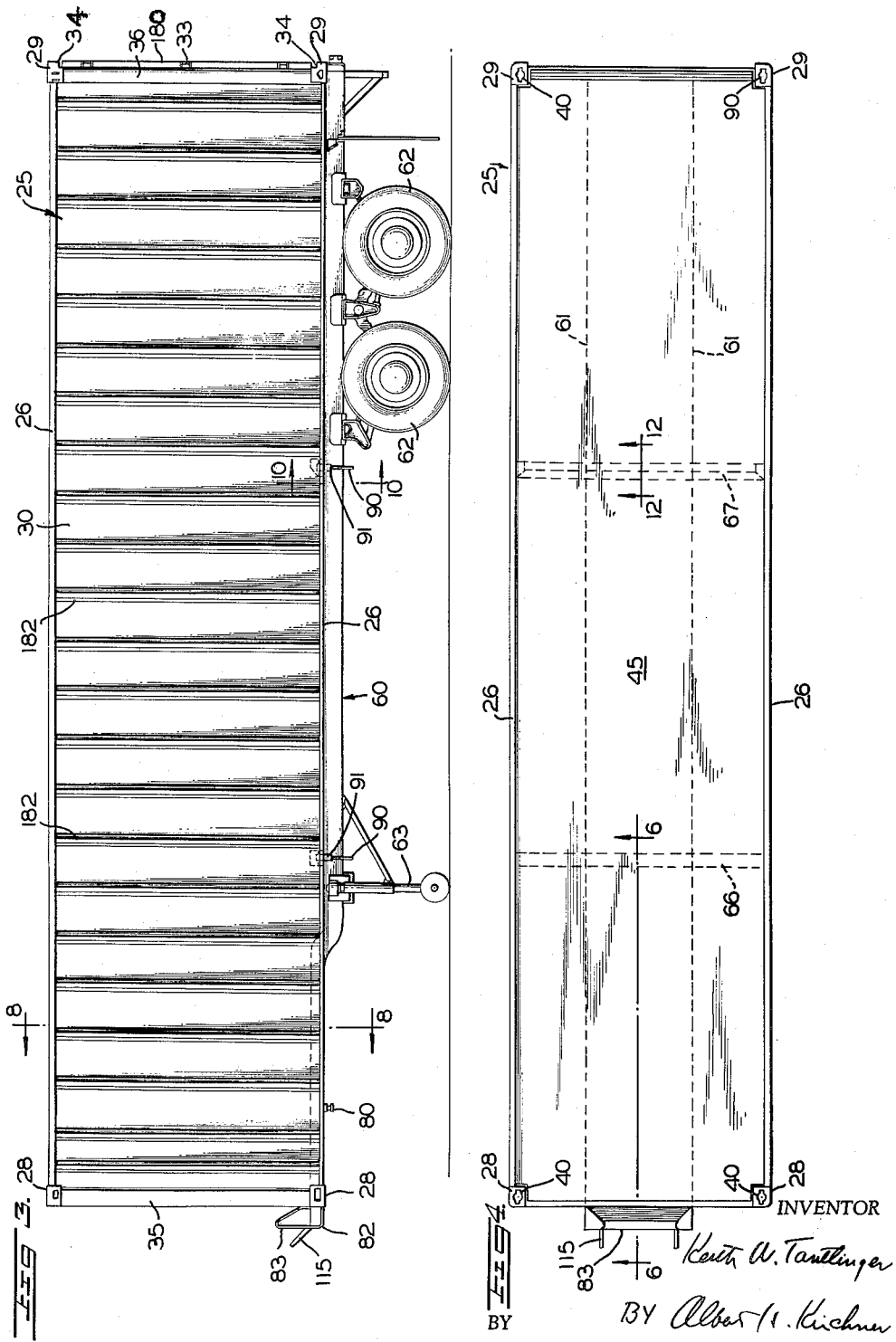

March 27, 1962     K. W. TANTLINGER     3,027,025
APPARATUS FOR HANDLING FREIGHT IN TRANSIT
Filed April 8, 1958     18 Sheets-Sheet 4
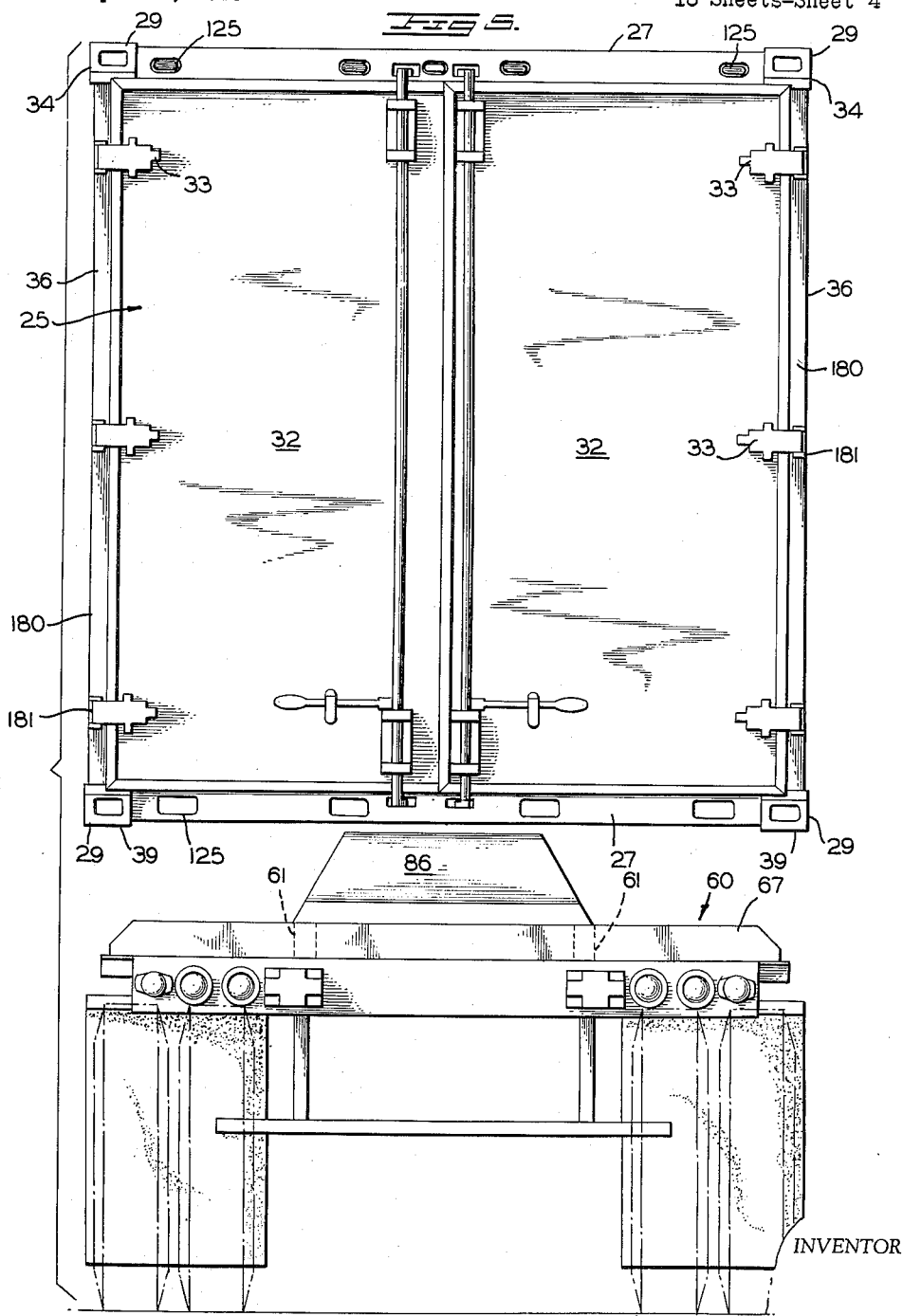
INVENTOR
Keith W. Tantlinger
BY Albert H. Kirchner
ATTORNEY March 27, 1962     K. W. TANTLINGER     3,027,025
APPARATUS FOR HANDLING FREIGHT IN TRANSIT
Filed April 8, 1958     18 Sheets-Sheet 5
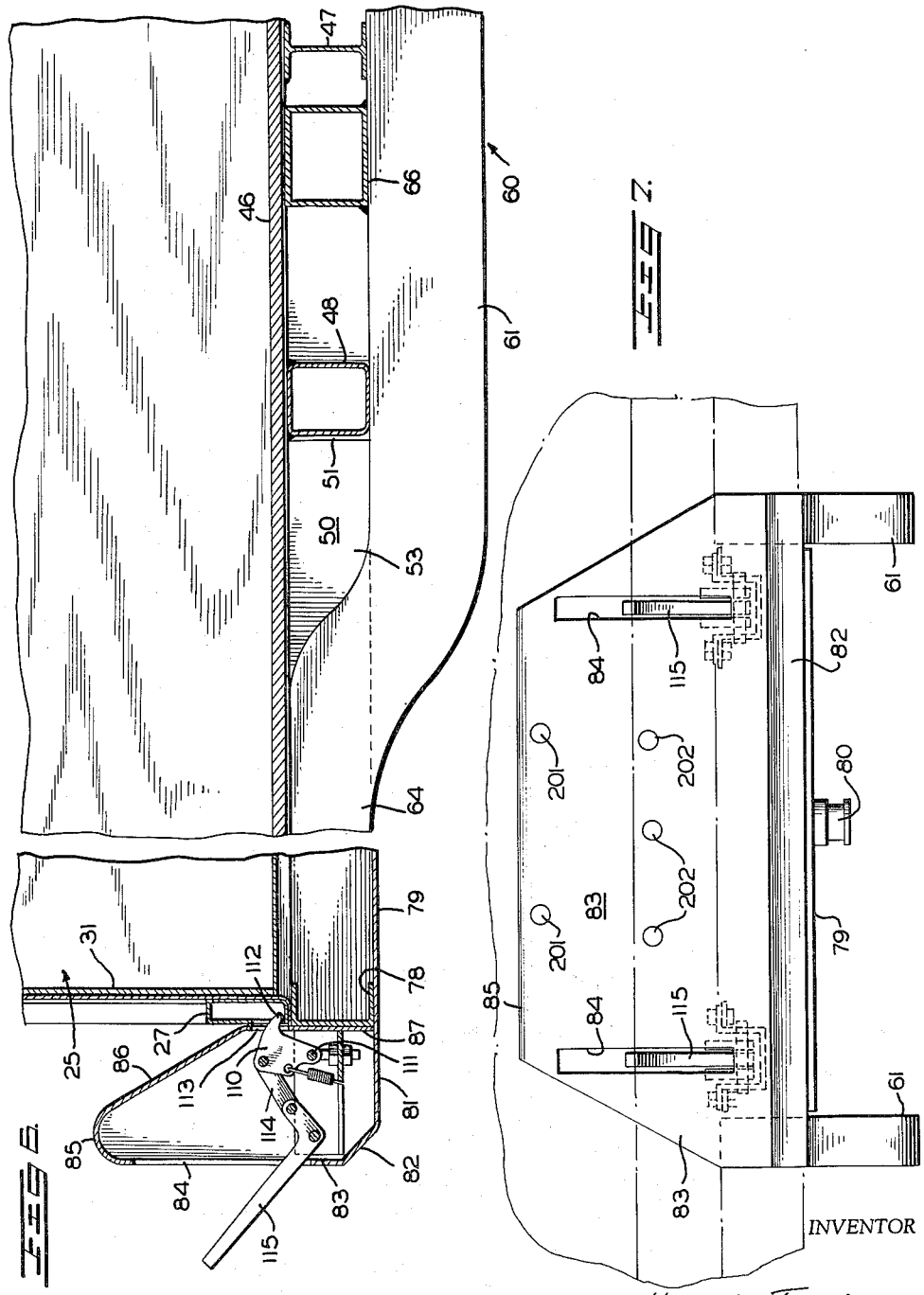
INVENTOR
Keith W. Tantlinger
BY Albert H. Kirchner
ATTORNEY

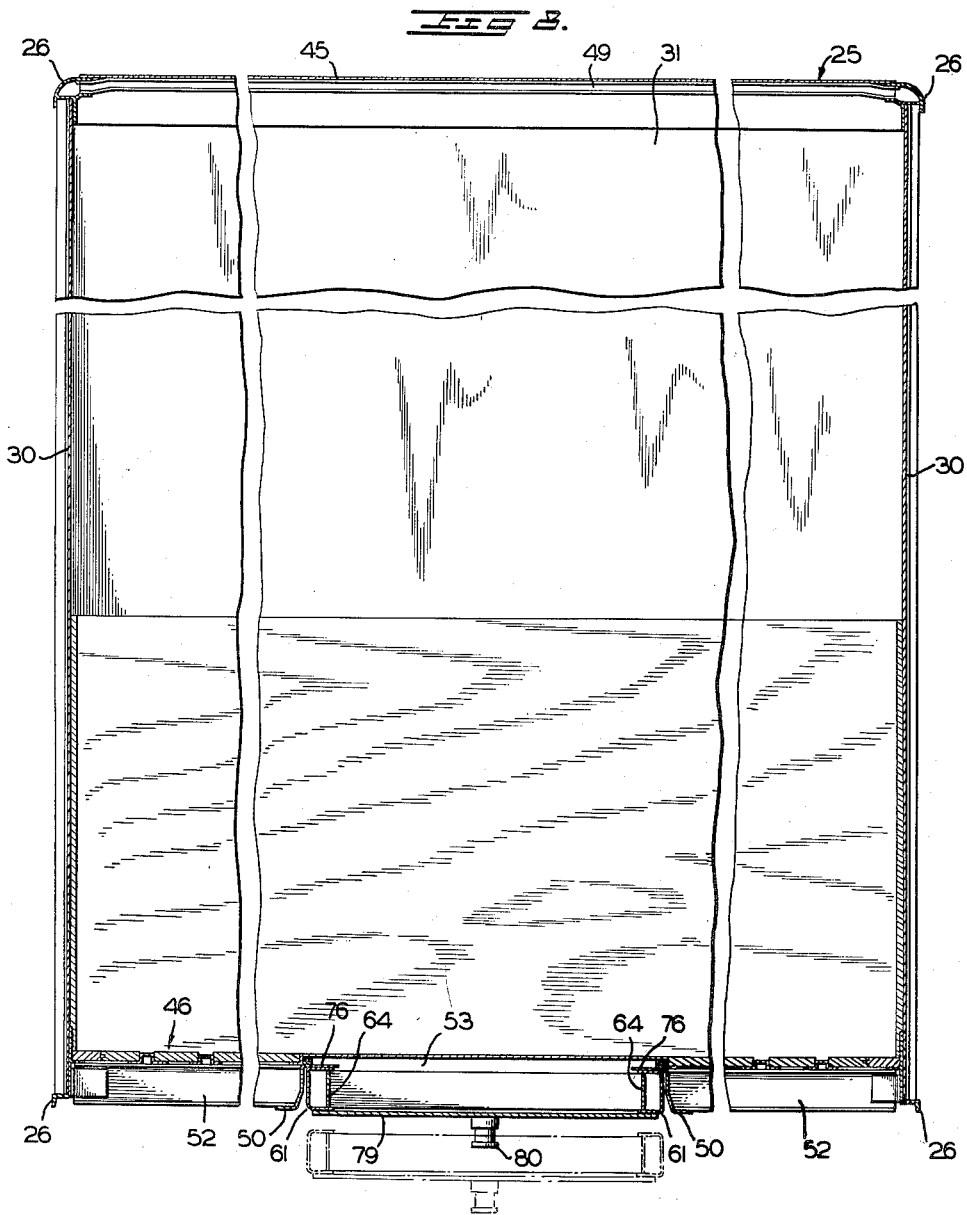

March 27, 1962  K. W. TANTLINGER  3,027,025
APPARATUS FOR HANDLING FREIGHT IN TRANSIT
Filed April 8, 1958  18 Sheets-Sheet 7
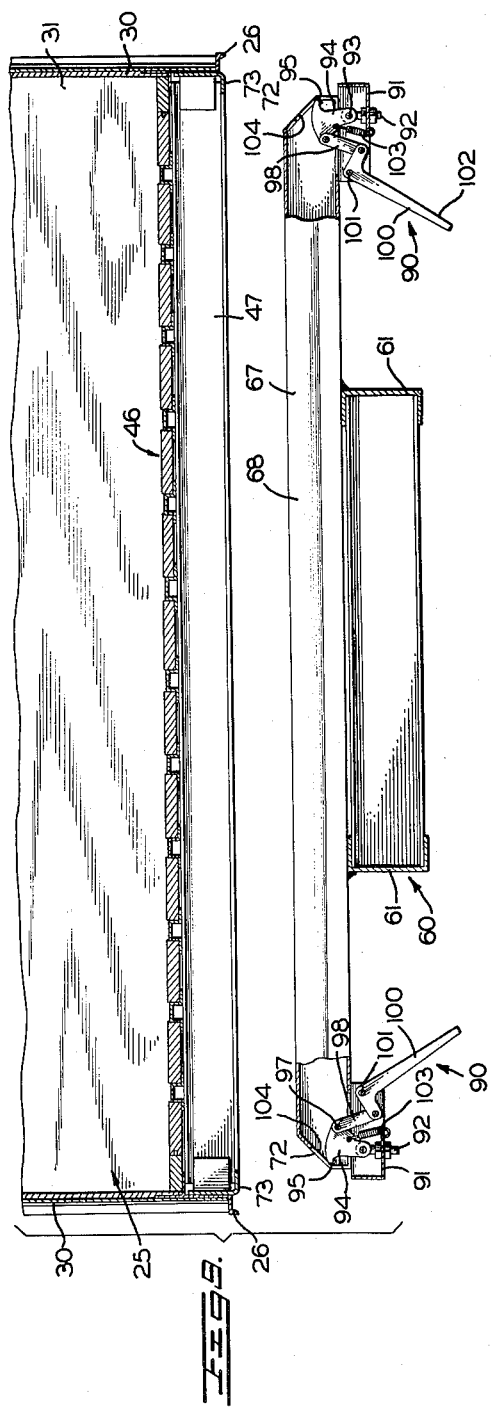
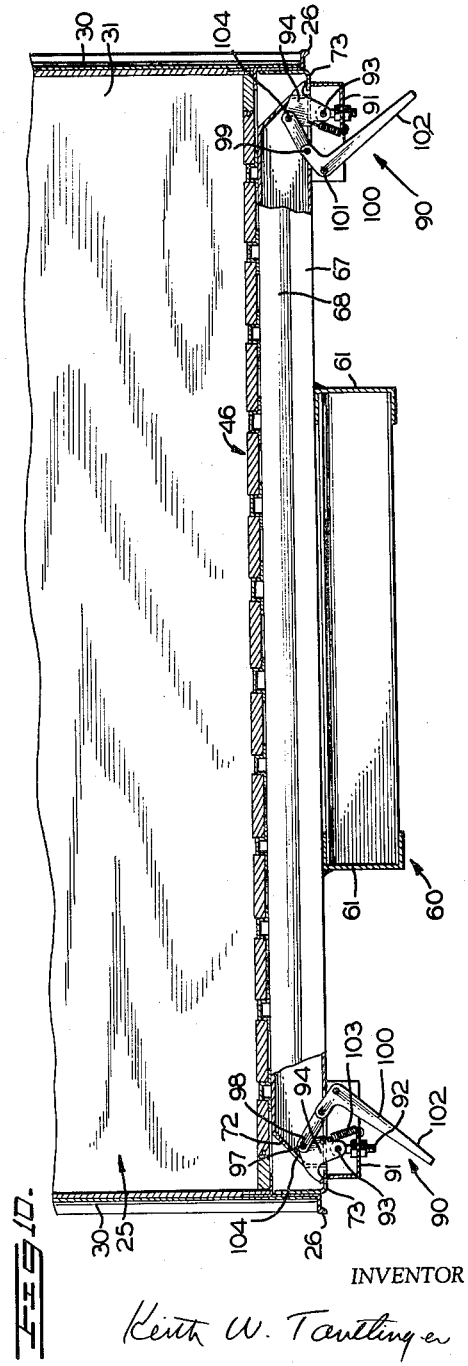
INVENTOR
Keith W. Tantlinger
Albert H. Kirchner
BY
ATTORNEY

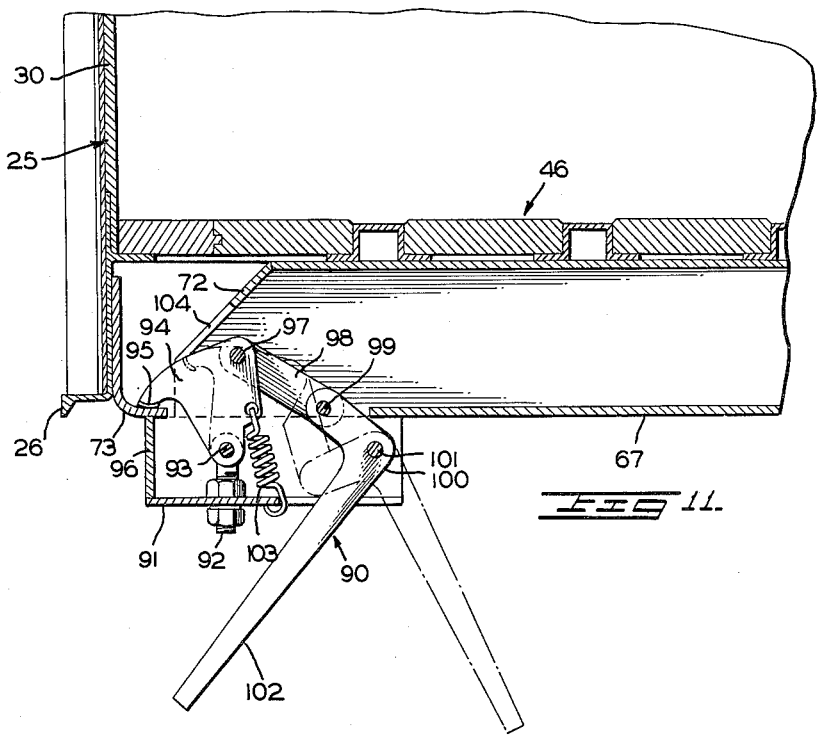
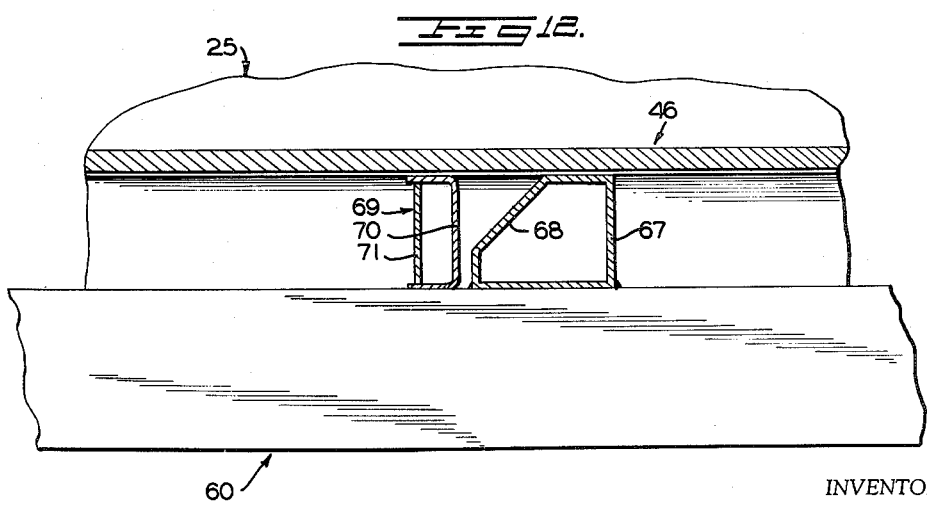

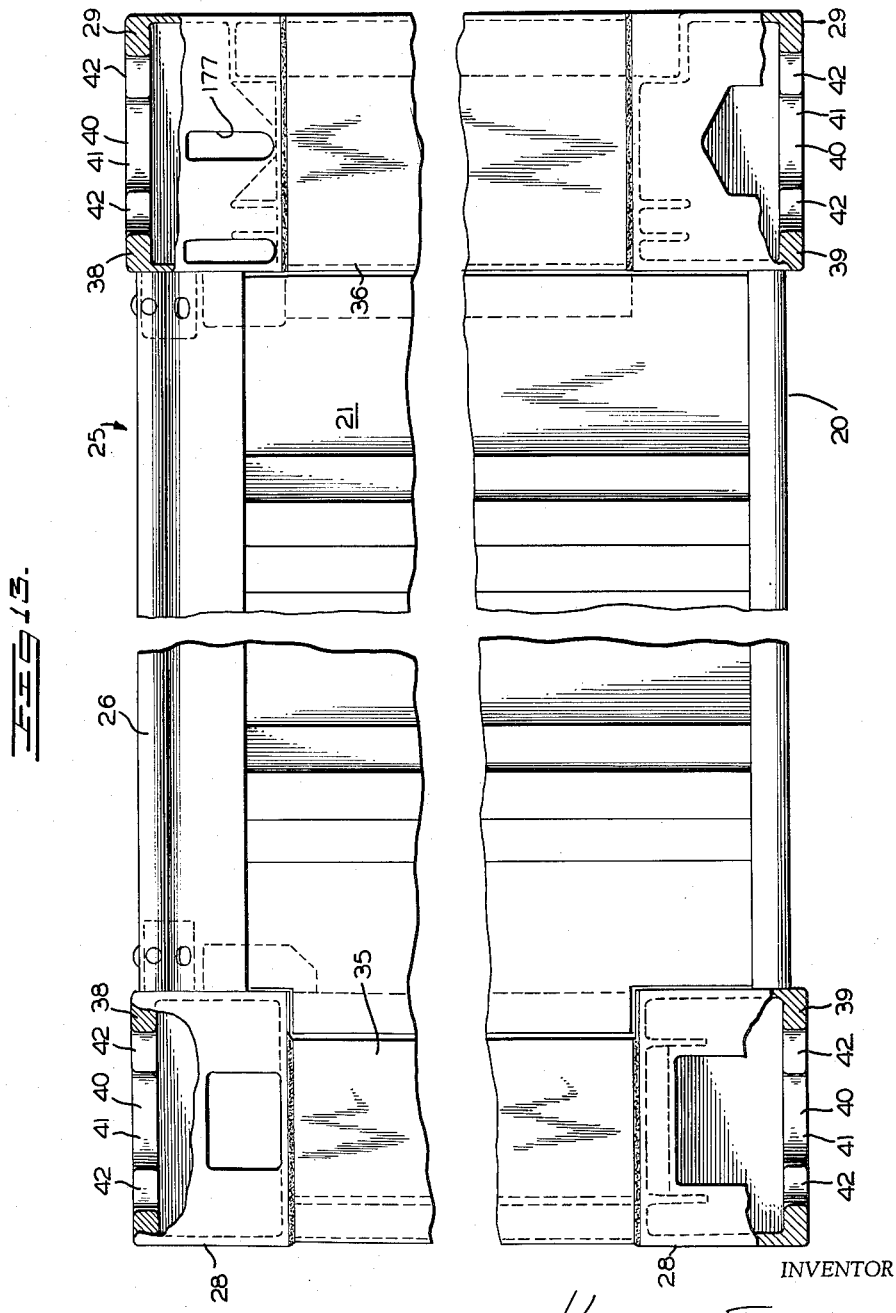

March 27, 1962  K. W. TANTLINGER  3,027,025
APPARATUS FOR HANDLING FREIGHT IN TRANSIT
Filed April 8, 1958  18 Sheets-Sheet 10
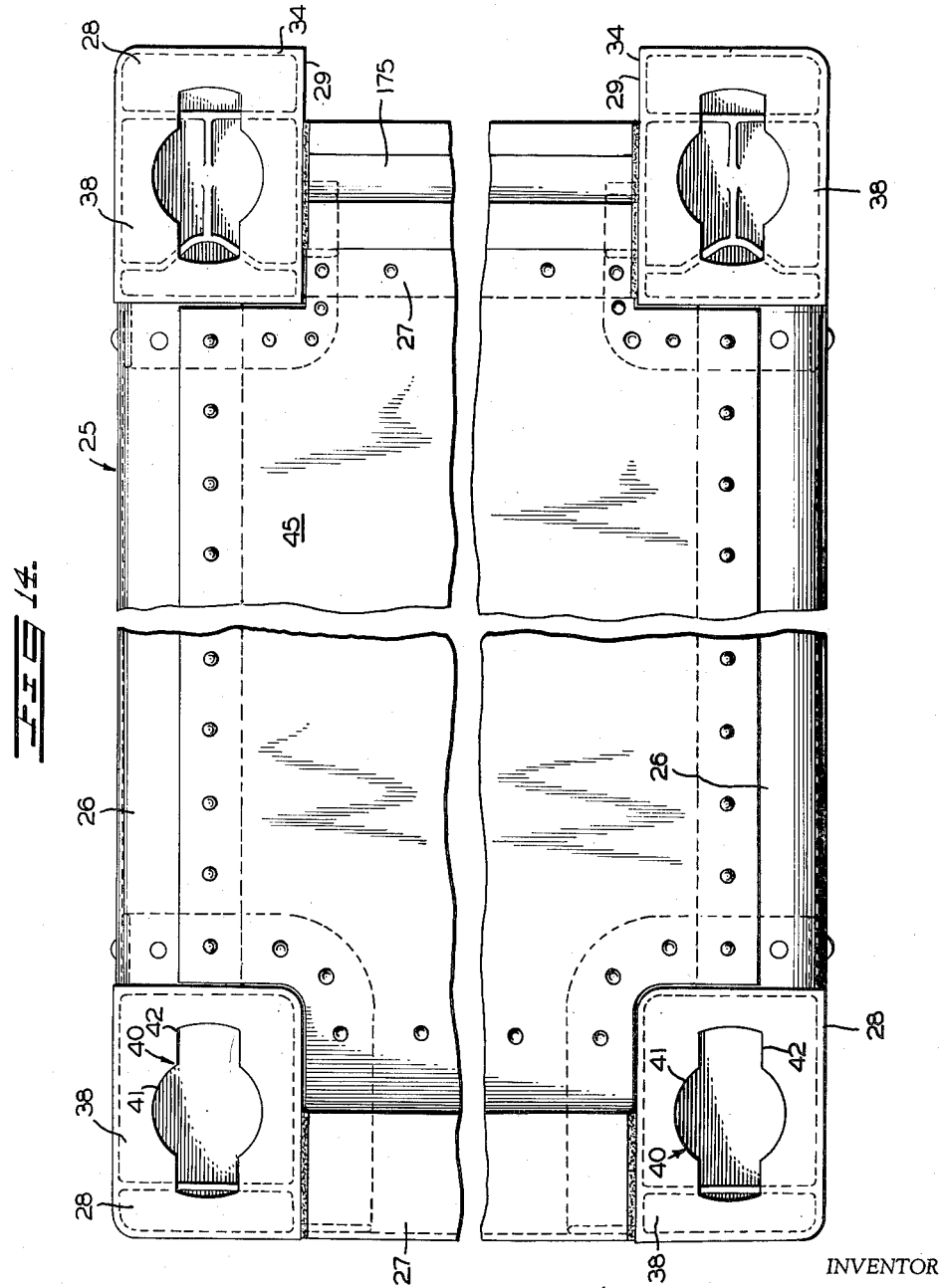
INVENTOR
Keith W. Tantlinger
Albert H. Kirchner
BY
ATTORNEY March 27, 1962  K. W. TANTLINGER  3,027,025
APPARATUS FOR HANDLING FREIGHT IN TRANSIT
Filed April 8, 1958  18 Sheets-Sheet 11

INVENTOR
Keith W. Tantlinger
BY Albert K. Kirchner
ATTORNEY

March 27, 1962 K. W. TANTLINGER 3,027,025
APPARATUS FOR HANDLING FREIGHT IN TRANSIT
Filed April 8, 1958 18 Sheets-Sheet 12
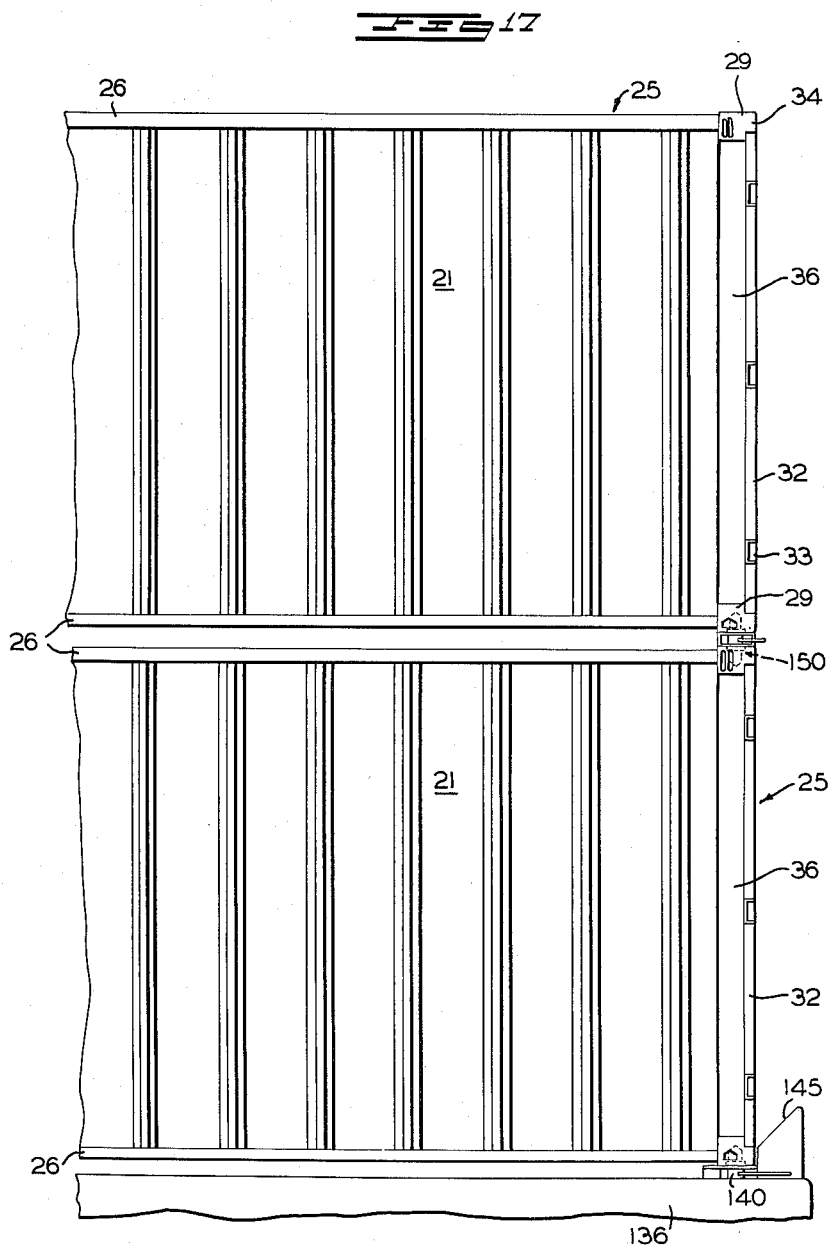
INVENTOR
Keith W. Tantlinger
Albert H. Kirchner
BY
ATTORNEY

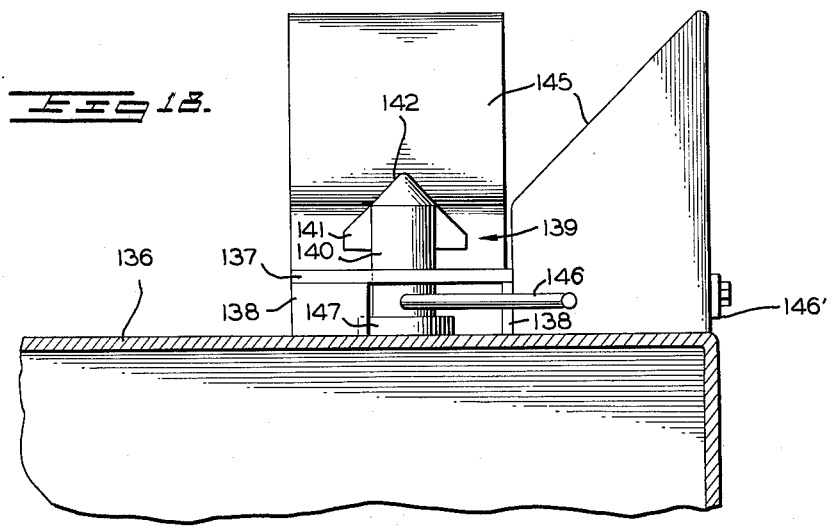
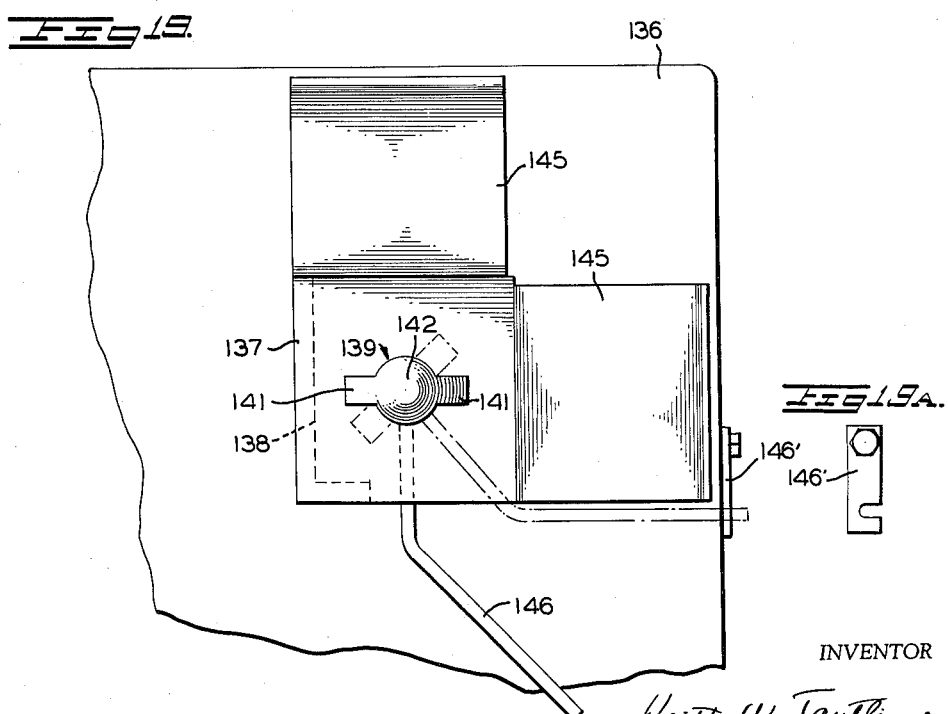

March 27, 1962 K. W. TANTLINGER 3,027,025
APPARATUS FOR HANDLING FREIGHT IN TRANSIT
Filed April 8, 1958 18 Sheets-Sheet 14
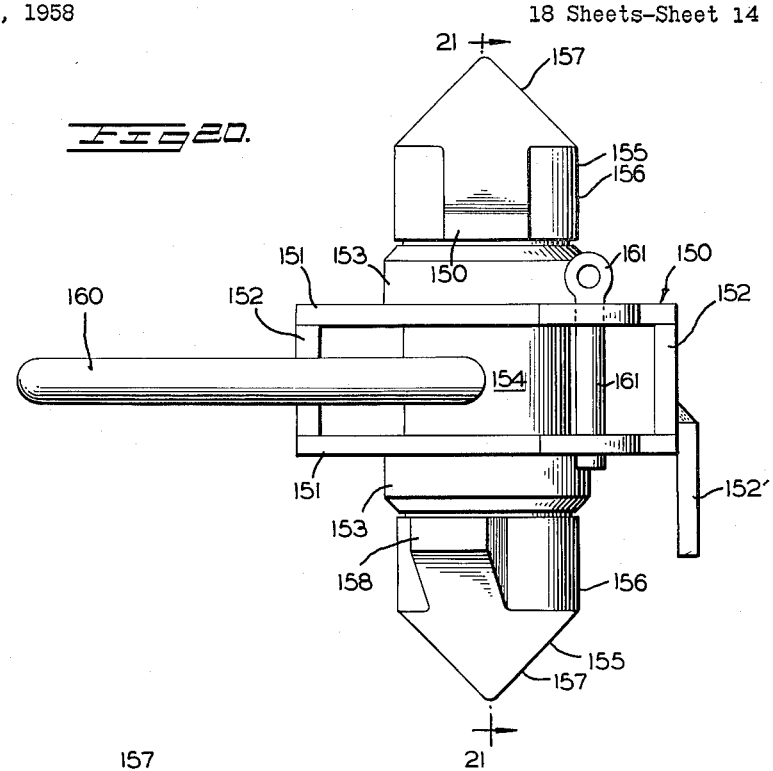
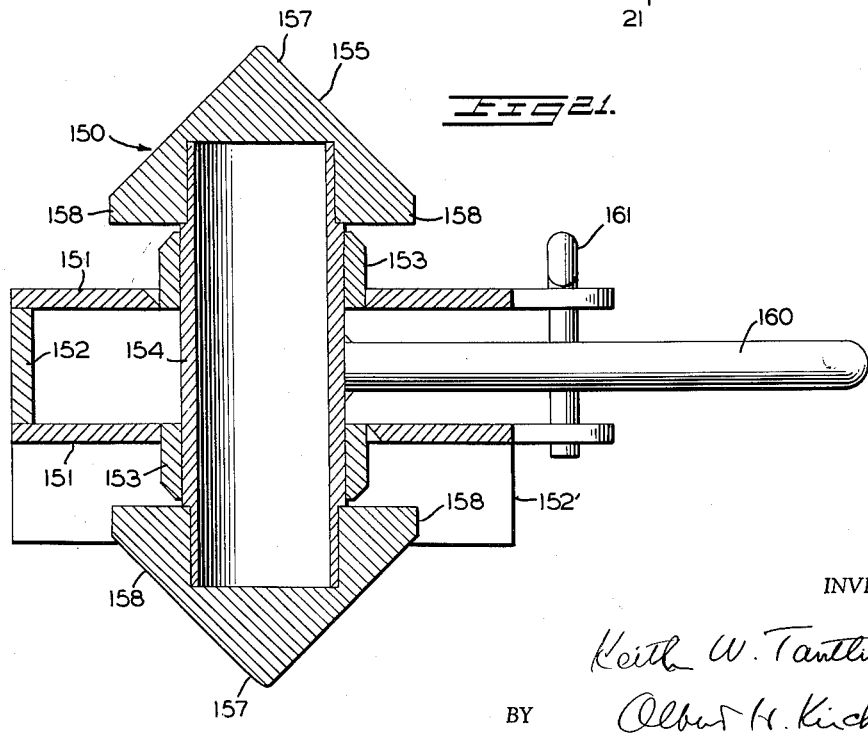
INVENTOR
Keith W. Tantlinger
Albert H. Kirchner
BY
ATTORNEY March 27, 1962     K. W. TANTLINGER     3,027,025
APPARATUS FOR HANDLING FREIGHT IN TRANSIT
Filed April 8, 1958     18 Sheets-Sheet 15
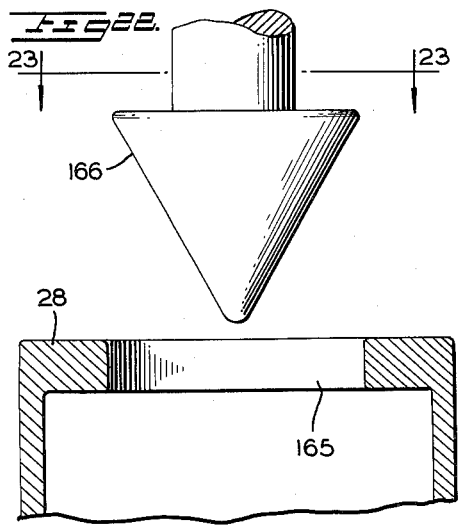
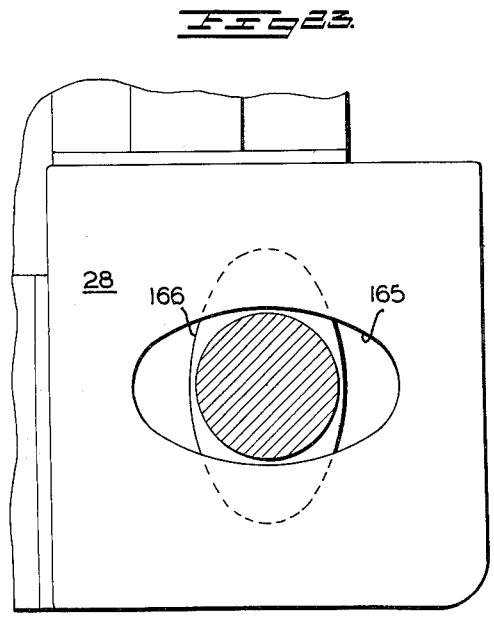
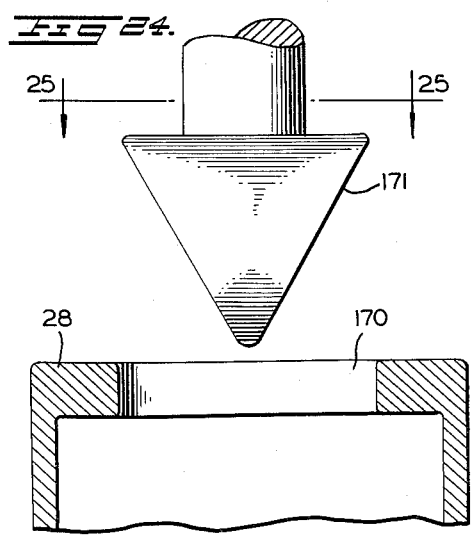
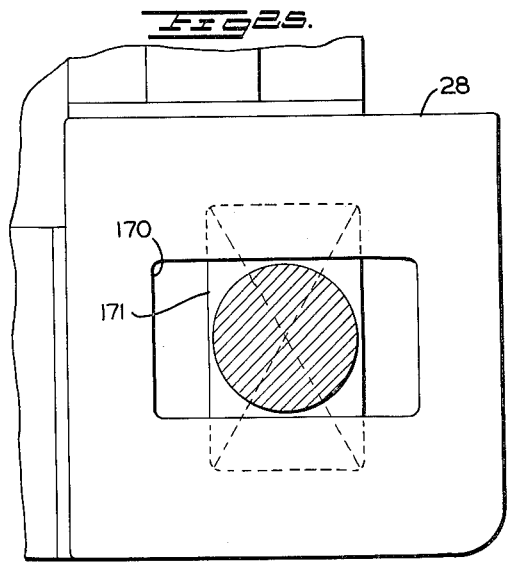
INVENTOR
Keith W. Tantlinger
Albert H. Kirchner
BY
ATTORNEY

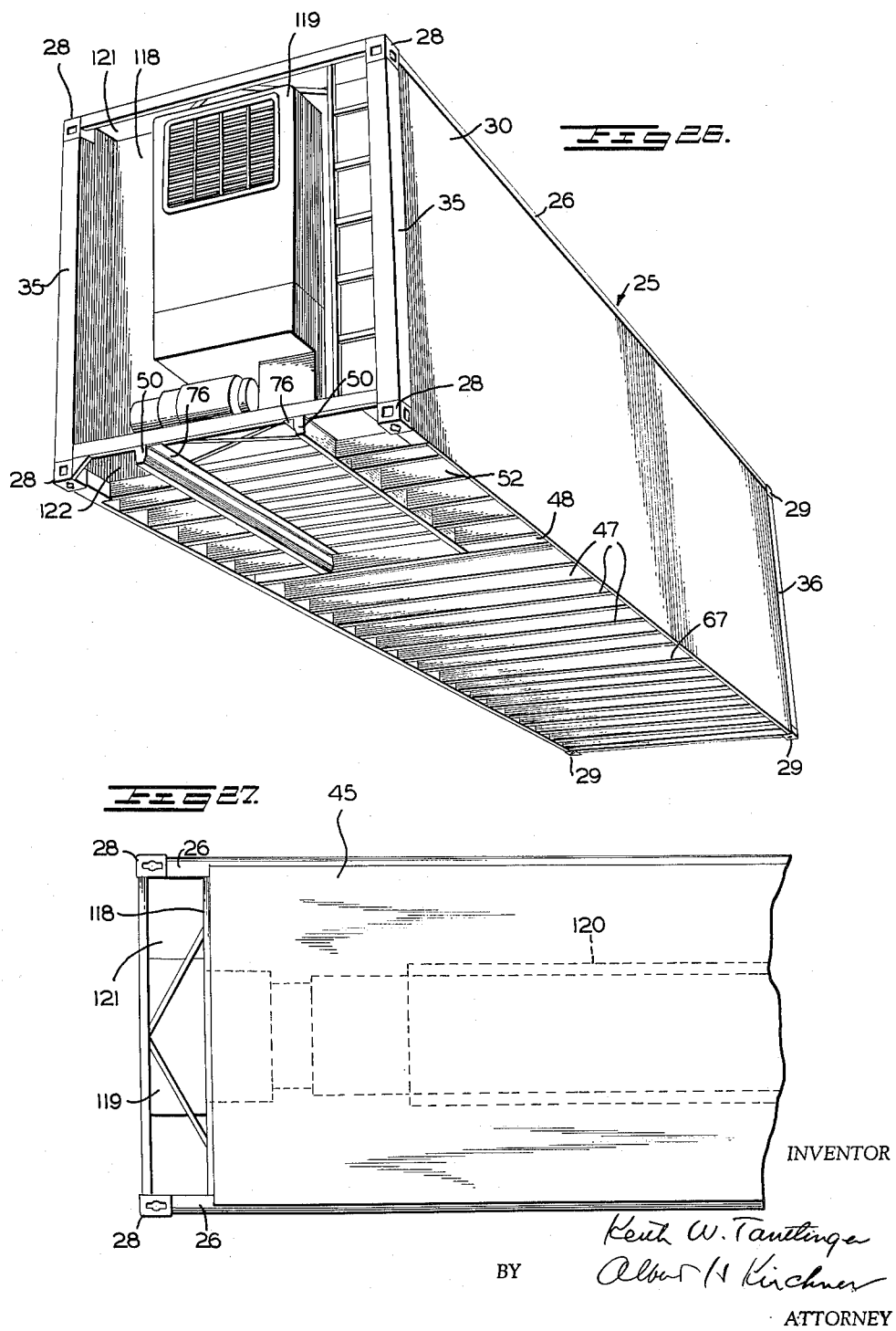

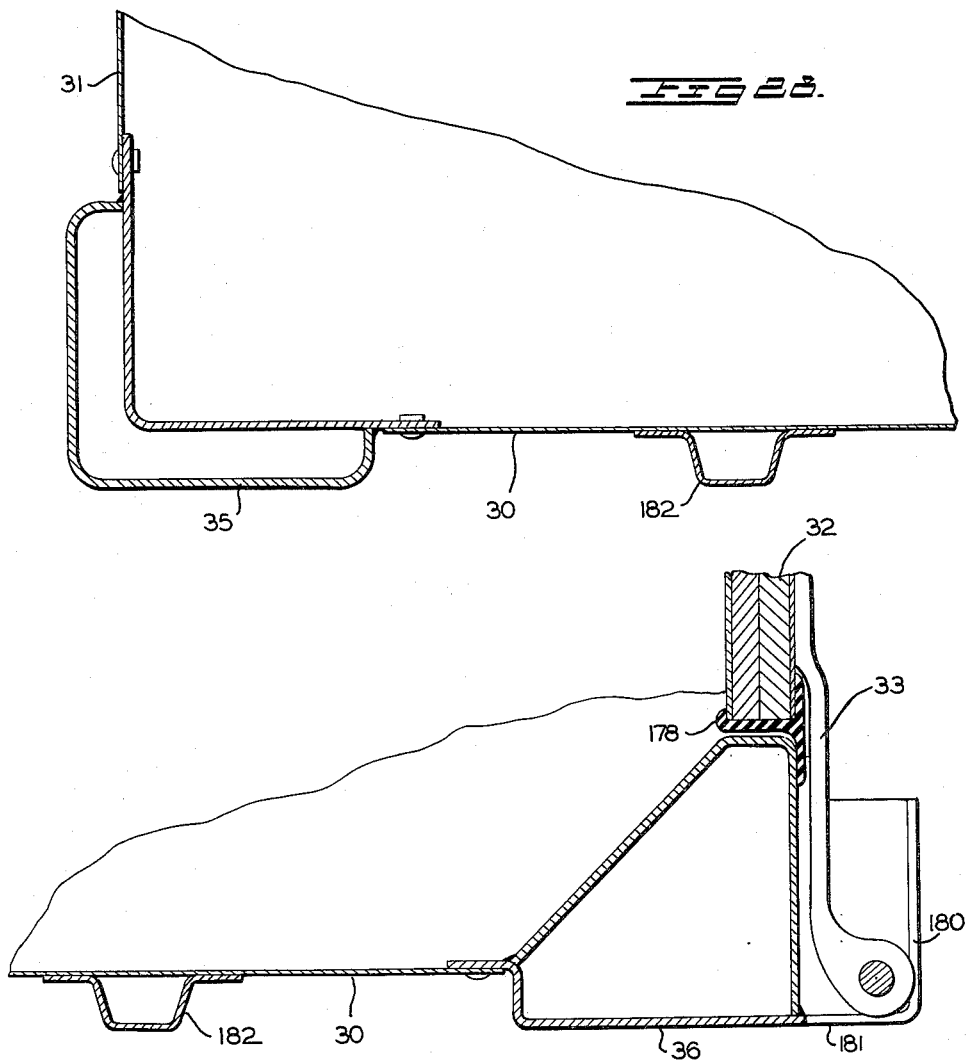

March 27, 1962 K. W. TANTLINGER 3,027,025
APPARATUS FOR HANDLING FREIGHT IN TRANSIT
Filed April 8, 1958 18 Sheets-Sheet 18

INVENTOR
Keith W. Tantlinger
BY Albert H. Kirchner
ATTORNEY

United States Patent Office 3,027,025
Patented Mar. 27, 1962

3,027,025
APPARATUS FOR HANDLING FREIGHT
IN TRANSIT
Keith W. Tantlinger, Mobile, Ala., assignor to Sea-Land Service, Inc., Newark, N.J., a corporation of Delaware
Filed Apr. 8, 1958, Ser. No. 727,165
7 Claims. (Cl. 214—38)

This invention relates generally to the handling of freight in transit and provides certain instrumentalities, elements and combinations useful in practicing the invention disclosed in my copending application Serial No. 682,512, filed September 9, 1957.

In the copending application referred to there are disclosed cooperative structures combining to constitute a novel system of handling freight in successive overland and marine transportation, particularly with reference to the lifting from the frames or chassis of highway truck trailers the removable bodies thereof utilized for the packing of articles of freight and the transferring of such trailer bodies to a ship for transportation by water to a port of destination. The system is reversible at the destination of the ship, the invention being there operative for the unloading of the trailer bodies from the ship.

The present invention contemplates the use of novel means for facilitating the employment of trailer bodies as freight boxes or containers by providing means whereby a trailer body may be secured to a trailer chassis for the overland transporting of the freight, and wherein the means for securing the trailer body in position on the chassis is readily releasable whereby the body is free to be hoisted and stowed aboard ship.

Principal objects of the invention are concerned with facilitating the lowering of the trailer bodies into position on the trailer chassis, including means for guiding the body to a proper seating position to be latched on the chassis; to provide effective means for connecting the body to lifting crane means to be hoisted from the chassis, and to provide means related to the particular lifting means employed for facilitating the stacking of the trailer bodies or boxes aboard ship in superposed relation in the hold or in superposed interlocking relation on the deck or hatch cover for safe marine transport.

Other objects are concerned with providing trailer bodies constituting freight containers which are capable of being stacked in superposed relation directly upon each other in considerable number so as to fill the hold, from bottom to hatch, of a large seagoing vessel, and to this end the bodies are made in accurately right parallelepipedal form, of rectangular outline at all vertical and cross sectional planes, with no external protuberances, so as to fit in sliding relation in vertical cells formed in the hold by four spaced upright corner angles, and are provided with flat roofs and floors, and with strong structural corner posts which project beyond the roofs and floors so as to bear all the load of a superposed similar body.

A related object is to provide bodies of the foregoing type having special corner post construction involving no obstruction projecting into the interior, so that the interior surfaces of the side and end walls meet in right angular vertexes, thus enhancing the load carrying capacity of the containers.

Referring now to the accompanying drawings, which depict in structural form certain preferred embodiments of the various cooperating features used in the practice of the invention, FIGURE 1 is a side elevational view illustrating a portion of a side of a ship's hull with a gantry and bridge construction thereon shown connected to and supporting a vehicle body or box in position above a trailer chassis adapted to support the box in transit;

FIG. 2 is a side elevational view showing in more detail and on an enlarged scale the trailer chassis and box in the relative positions shown in FIG. 1;

FIG. 3 is a similar view showing the box in position on the trailer chassis;

FIG. 4 is a top plan view of the same;

FIG. 5 is a rear elevational view of the box or body and trailer chassis shown separated;

FIG. 6 is an enlarged fragmentary vertical sectional view on the line 6—6 of FIG. 4;

FIG. 7 is an end elevational view of the structure shown in FIG. 6;

FIG. 8 is an enlarged vertical sectional view on the line 8—8 of FIG. 3;

FIG. 9 is an enlarged fragmentary vertical sectional view on the line 9—9 of FIG. 2;

FIG. 10 is a similar view on the line 10—10 of FIG. 3;

FIG. 11 is an enlarged fragmentary vertical sectional view showing the interlocking portions of a box and trailer chassis;

FIG. 12 is an enlarged fragmentary vertical sectional view on the line 12—12 of FIG. 4;

FIG. 13 is an enlarged side elevational view of a body or box, parts being broken away and parts being shown in section;

FIG. 14 is a plan view of the same;

FIG. 16 is a similar view showing the parts interlocked;

FIG. 17 is a fragmentary side elevational view showing the superposed end portions of two boxes supported on a ship's hatch cover or the like;

FIG. 19 is a plan view of the same;

FIG. 19a is a plan view of a keeper for one of the stacking lug operating handles;

FIG. 20 is an enlarged side elevational view of the means for interlocking superposed corner portion of two boxes;

FIG. 21 is a sectional view on the line 21—21 of FIG. 20;

FIG. 22 is an enlarged fragmentary sectional view showing a modified type of interlocking lug and vehicle body or box, with the parts in unlocked relation;

FIG. 23 is a sectional view on the line 23—23 of FIG. 22 showing the parts interlocked in operative position;

FIG. 24 is a sectional view similar to that of FIG. 22 showing a further modified type of interlocking means;

FIG. 25 is a sectional view on the line 25—25 of FIG. 24 showing the parts interlocked;

FIG. 26 is an underside perspective view of a modified type of trailer body or box having a refrigerating unit associated therewith;

FIG. 27 is a plan view of the front end portion of the same;

FIG. 28 is an enlarged fragmentary horizontal cross sectional view through one of the front corner portions of the box, showing one of the front corner posts;

FIG. 29 is a similar view through one of the rear corner portions of the box, showing one of the rear corner posts;

Figure 15:
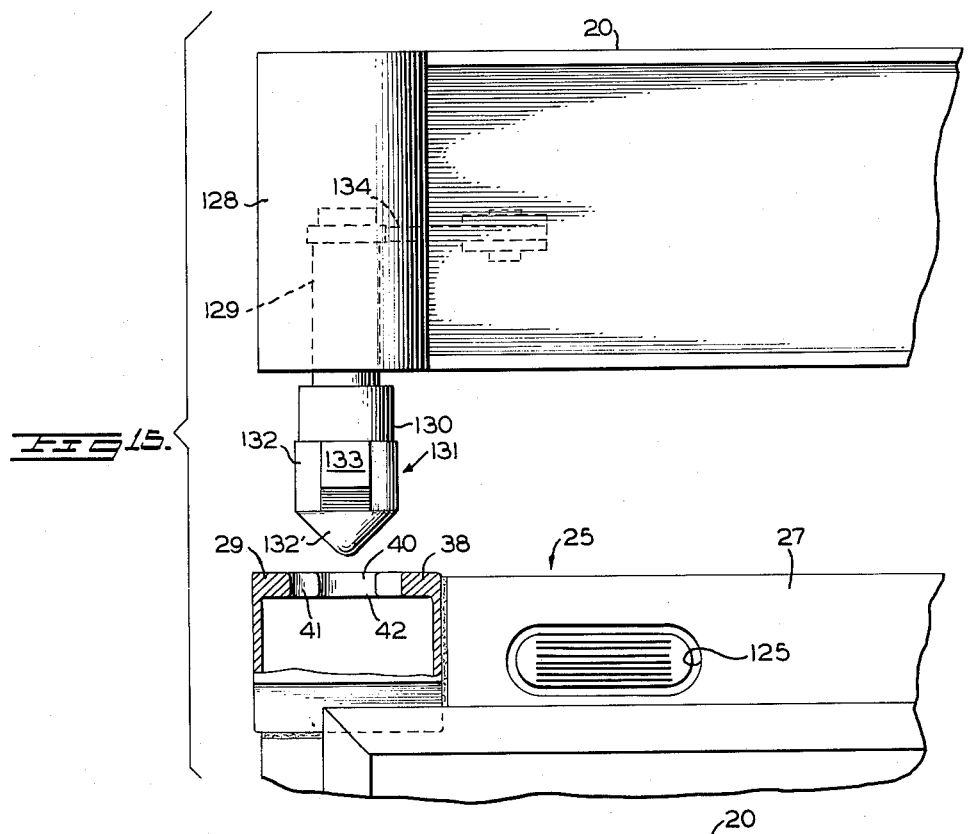
FIG. 15 is an enlarged fragmentary end elevational view of one corner portion of the interlocking elements of a lifting crane beam and the body or box parts being shown in section and the interlocking elements being shown separated.

Referring to FIG. 1, the numeral 10 designates the side of a ship docked adjacent a pier, having a roadway surface which is indicated by the numeral 11. On the ship's deck are supported the rails of a trackway 12 on which is mounted a gantry 13 for movement longitudinally of the ship and supporting thereabove a bridge 14 movable transversely of the ship on rails 15 supported by the gantry. The bridge carries a suitable power source 16 connected through appropriate transmission means to pulleys 17 around which are reeved cables 18 extending at their lower runs around pulleys 19 carried by a lift frame 20 which may be provided with a control cab 21. The elements so far described form no part per se of the presently claimed invention, except as referred to below.

The present invention is particularly adapted, among other things, to facilitate the transfer of shipping boxes, shown in the present instance as roadway vehicle trailer bodies, from a trailer chassis to such portions of a marine vessel as may be desired, and reversing such procedure at the port of destination of the ship. The box or trailer body, referred to hereinafter as the box, is shown in various figures of the drawings, for example, FIGS. 1–6, inclusive, 8, 9, 10, and 13–17, inclusive. Such box is indicated as a whole by the numeral 25 and comprises upper and lower longitudinal frame members 26 at opposite sides of the box and transverse frame members 27 at opposite ends of the box. At each of the four front corners of the box is arranged a heavy box-like steel casting 28, and at each of the four rear corners a generally similar heavy box-like steel casting 29 is provided. Each corner of the box is provided with a corner post connected between associated pairs of upper and lower castings 28 or 29. The two front corner posts, which are of identical construction, but are relatively reversely positioned in the structure, are designated 35, and the two rear corner posts, which are alike, though different in detail from the front corner posts, are relatively reversely positioned and are designated 36. These two kinds of corner posts, which are the full load-bearing members of the boxes, will be described in detail hereinafter. The castings 28 and 29 are welded to the upper and lower end surfaces of the respective corner posts 35 and 36, and are riveted to the fore and aft frame members at the top and bottom of the side panels, as is perhaps best shown in FIG. 30 for one of the top castings 29, and in FIG. 13 for one of the top castings 28.

The sides of the box are closed by side walls 30. The front end is closed by a wall 31 and the top by a roof sheet 45 (FIG. 8), and the rear end is normally closed by doors 32 hinged as at 33 to the adjacent corner posts 36. It will be noted, by comparing FIG. 29 with FIG. 3, for example, that the surfaces of the doors 32 are inset from the surfaces of the hinges 33, and the hinges are protected by covering flanges 180 formed on the rear corner posts (hereinafter to be explained more in detail), so as to eliminate any overhanging surfaces at the associated end of the body. It will further be noted in FIGS. 3 and 30 that the corner castings 29 are provided with overhangs 34, the outer surfaces of which extend outwardly beyond the plane of the surfaces of the doors 32 and hinges 33, to be flush with the flanges 180, as will also hereinafter be described in more detail.

As best shown in FIG. 13, each upper casting 28, 29 is provided with a top wall 38, and each bottom casting 28, 29 is provided with a similar bottom wall 39. Each of the walls 38 and 39 is provided with a keyhole slot 40, being circularly enlarged centrally as at 41 and having oppositely longitudinally extending straight end extensions 42 of reduced width.

Figure 31:
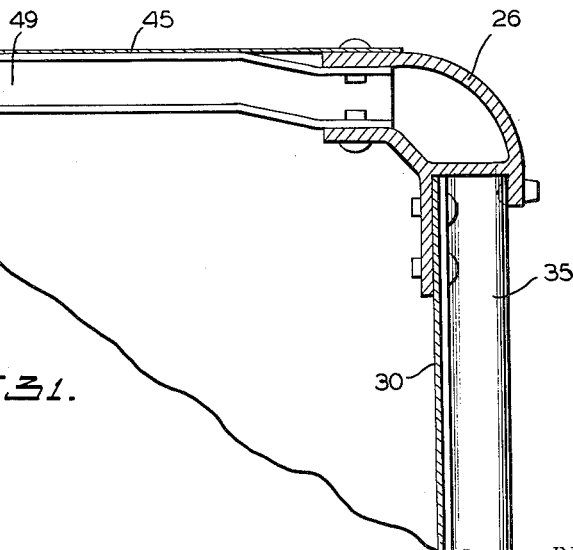
FIG. 31 is an enlarged fragmentary vertical cross sectional view through the intersecting portions of the roof and side wall, showing the top rail in cross section and the upper portion of a corner post in elevation.

The box is provided with a roof sheet 45 (FIGS. 8 and 14) riveted at its edges to the top frame members 26 and 27 and supported by relatively light spaced cross members 49 whose ends are fitted into the side frame members 26 (FIGS. 8 and 31). The box is provided with a floor, indicated as a whole by the numeral 46, supported by a plurality of transverse spaced structural members 47, preferably in the form of I-beams. Next to the forwardmost beam 47, a transverse structural member 48 (FIG. 6), preferably in the form of a box beam, extends from side to side of the box for a purpose hereinafter to be described.

Longitudinally extending spaced structural members 50 (FIGS. 8 and 26) are welded at their rear ends to the box beam 48 as at 51 (FIG. 6) and from each of the structural members 50 extends a plurality of transverse structural members 52 (FIG. 26). All of the structural members 47, 48, 51 and 52 have their lower extremities arranged in a common plane. The structural members 48 and 50 centrally of the width of the vehicle form a well 53, the purpose of which is described below. The well 53 is open at its forward end as shown in FIGS. 6 and 26.

A trailer chassis on which a box is adapted to be conveyed to the dock side or other place where the box is to be transferred to a ship is indicated as a whole by the numeral 60. This trailer chassis comprises spaced longitudinal side frame members 61 suitably conventionally connected to each other and supported at their rear ends on a dual axle supporting wheel unit 62. When not coupled with a tractor, the forward end of the trailer is adapted to be supported on the roadway by the usual auxiliary legs 63 which serve as pedestals for small wheels or rollers on which the trailer is capable of rolling back slightly when a tractor is backed under it. The forward end portions of the side frame member 61 are offset upwardly as at 64 for a purpose hereinafter to be explained.

In addition to conventional connecting means between the side frame members 61, a pair of closed section beams 66 and 67 extend across and are welded to the tops of the side frame members. These cross members 66 and 67 extend substantially beyond the frame members 61 and are of a length approximately equal to the width of the box 25. The forward cross member 66 may be of box section as shown in FIG. 6, while the other cross member 67 is shaped in cross section as shown in FIG. 12, being of closed section with a downwardly and forwardly sloping front wall 68 for a purpose which will be described hereinafter. One of the cross members beneath the box 25, arranged between an adjacent pair of the I-beams 47, is of the type shown in FIG. 12 and indicated by the numeral 69. This cross member comprises a channel 70 set on edge and braced by a transverse vertical plate 71. It will be apparent that when a box 25 is being lowered into position on the chassis, the lower, advancing edge of the cross member 70 may be guided downwardly and forwardly by the sloping wall 68 of the chassis cross member 67 if such action is required by misalignment of the parts.

As shown in FIGS. 9 and 10, the ends of the cross member 67 are provided with downwardly and outwardly sloping cam surfaces or walls 72 which are engageable by plates 73 welded or otherwise secured to the adjacent frame members 26 of the box 25, thus assisting in guiding the box laterally of the trailer in the downward movement of the box.

As previously stated, the forward end portions of the chassis side frame members 61 are offset upwardly at 64. These portions of the chassis frame are received in the box well 53 as shown in FIGS. 6 and 8. The longitudinally extending frame members 50 of the box 25 (FIG. 8) slope downwardly and outwardly transversely of the box to form cam surfaces engageable with the chassis frame member portions 64 to guide the box laterally of the chassis at its forward end when the box is being lowered into position. When the box comes to rest on the frame members 61, the tops of these frame members bear against inwardly extending flanges 76 formed on the members 50.

Referring to FIG. 6, it will be seen that the forward ends of the frame portions 64 are connected by a transverse structural channel member 78. Against the bottom of this member and against the bottoms of the frame portions is welded a fifth wheel plate 79 (FIGS. 2, 6 and 8). This plate carries a depending stub 80 for pivotal connection with the rear platform of the tractor with which the trailer chassis is adapted to be connected in a conventional and well known manner.

The plate 79 extends forwardly of the cross member 78 as at 81, then slopes upwardly as at 82 to provide a cam surface to facilitate the coupling of the tractor and trailer. Forwardly of the cam surface 82 the plate 79 has a vertically extending wall 83 provided with vertically elongated slots 84 (FIGS. 6 and 7). At the upper end of the wall 83 the member 79 curves rearwardly as at 85 and then extends downwardly and rearwardly as a cam wall 86, terminating in a downwardly and vertically extending wall 87 lying against the cross member 78. The cam surface 86 is adjacent the lower front cross member 27 of the box and serves to engage this member to cam the box rearwardly if the box is lowered on the chassis somewhat forwardly of its proper seating position.

Means are provided for anchoring the box in properly seated position on the trailer chassis, preferably in the form of locking or latching means associated with opposite ends of the cross members 66 and 67. The locking members for both of these cross members are the same, and the one associated with the cross member 67 is shown in detail in FIGS. 9, 10 and 11. These locking members are generally indicated by the numeral 90 and only the ones shown in FIGS. 9, 10 and 11 will be specifically described. A channel member 91 is secured to each of the cross members 66 and 67 and is welded or otherwise connected thereto and provided with a bolt 92 having an eye in its upper end supporting a pivot pin 93 on which is mounted one end or corner of a generally triangular locking plate 94. A second end or corner of this plate, indicated by the numeral 95, is adapted to seat on the flange 73 to anchor this flange firmly in position on a wall 96 fixed to and projecting upwardly from the channel 91. The third corner of the plate 94 is pivoted as at 97 to one end of a link 98, and the other end of this link is connected as at 99 to the short arm of a bell crank lever 100, pivoted as at 101 between the side walls of the channel 91. The long arm 102 of the bell crank lever forms an operating handle. A tension spring 103 is connected between the plate 94 and the bottom of the channel 91 to bias the plate 94 for clockwise turning movement about its pivot 93. When the parts are unlocked as shown in FIG. 9, the handle 102 of each locking mechanism is swung inwardly and the locking end 94 is retracted into the cross member 66 or 67. When the handle 102 is swung laterally outwardly of the vehicle to the position shown in FIGS. 10 and 11, the locking end of the plate 94 will move through a slot 104 formed in the cam wall 72. When this position is reached, the pivot pin 99 will lie at a point above a plane passing through the pivot pins 97 and 101, and this overcenter movement of the pin 99 causes the spring 103 to exert a biasing force to hold the parts in locking position.

Very similar locking means is associated with the forward structure of the fifth wheel plate 79 for locking the forward end of the box in position. Two of the locking devices are so employed, as shown in FIG. 7. Each such locking device (FIG. 6) comprises a locking plate 110 pivotally supported as at 111 to rock its locking end 112 into engagement with the bottom of the adjacent flange portion of the frame member 27, the outer wall of this frame member and the upper end of the wall portion 89 being provided with aligned slots 113 through which the locking member projects. The locking member again is operated through a link 114 by movement of a bell crank lever 115 similar to the bell crank lever previously described, except that it is generally inverted. The overcenter arrangement of the various pivot points in FIG. 6 is the same as that shown in FIG. 11 so that the spring exerts a force tending to maintain the parts in locked position when moved to such position.

The boxes 25 may be of different types, and in FIG. 26 a modified type is shown in which the forward end of the box is recessed as at 118 to contain a refrigerating unit 119 from which cooling ducts 120 (FIG. 27) extend throughout the box. The recess 118 is open at its top and bottom as at 121 and 122 for the circulation of air therethrough. This is of importance when the boxes are stacked, whether on a hatch cover or in a hold. It will be noted that the entire refrigerating apparatus is recessed into the end of the box, eliminating any projections from the box end which would interfere with movement of the box into or out of the hold cells and analogous placement under close clearance conditions.

While of course the specific character of the refrigerating unit 119 installed in the recess 118 forms no part of the present invention, it has been found in practice that the apparatus sold under the name "Thermo-King" by U.S. Thermo Control Co., 44 Twelfth St. S., Minneapolis, Minn., is entirely acceptable. This is a self-contained compressor-condenser-expander unit powered alternatively by a propane engine and a 7½ H.P. 440 volt 60 cycle A.C. motor, both belt-connected to the compressor, with a centrifugal clutch in the engine drive. The engine powers the unit when the container or box is mounted on the truck chassis, and on shipboard the electric motor is connected to the vessel's power lines and takes over. Thus refrigeration is provided continuously and even stowing in closed holds presents no problem of dissipating engine exhaust. As will be noted from FIGS. 26 and 27, the highly vulnerable "reefer" unit 119 is well protected by the heavy framing defining the recess 118 so that the box can be lowered and hoisted between chassis and ship's hold or deck without danger of damage to the unit. Moreover, the overall dimensions of the refrigerated box are identical with those of the non-refrigerated containers heretofore described, so that all of them interchangeably fit the hold guide cells of the ship, the deck or hatch positions, stacking on each other, and mounting on the chassis, as will be understood.

Incidentally it may be mentioned also that, for the reasons suggested hereinabove, it is desirable to prevent protrusion of all other projecting elements from the main surface of the box, and to this end certain elements of the box, such as the members 27 (FIG. 5) are recessed as at 125 to provide for the usual road lights 126 when the box is moving as a trailer vehicle body.

The openings 40 in the castings 28, 29 are provided for two purposes. These openings facilitate the interlocking with the box of suitable lifting lugs for transferring the box from a trailer chassis to a ship and vice versa, and they also facilitate the positioning and securing together of the boxes in stacked relation. As shown in FIG. 15, each end of the crane 20 is provided with a pair of bearing members at 128, and each of these bearing members supports for rotation on a vertical axis a stem 129 carrying at its lower end a lug 130. Each lug 130 carries a grapple head 131 having a circular central portion 132 and diametrically projecting wings 133, the lug portions 132 and 133 corresponding in plan profile to the shapes of the openings 40 in the castings 28. The lower end of the circular lug portion 132 tapers downwardly to a blunt point as at 132' to facilitate insertion of the lug into the opening 40, the lower edges of the wings 133 forming continuations of the tapered lug portion 132'. Suitable operating means 134 is employed in conjunction with each stem 129 for rocking it 90° from the position shown in FIG. 15 to the position shown in FIG. 16. The crane is lowered with the parts in the positions shown in FIG. 15 for the insertion of the lug heads into the openings 40, whereupon the stems 129 are rotated 90° to turn the wings 133 transversely of the openings 40 to the position shown in FIG. 16 to lock the parts in engaged position.

Figure 18:
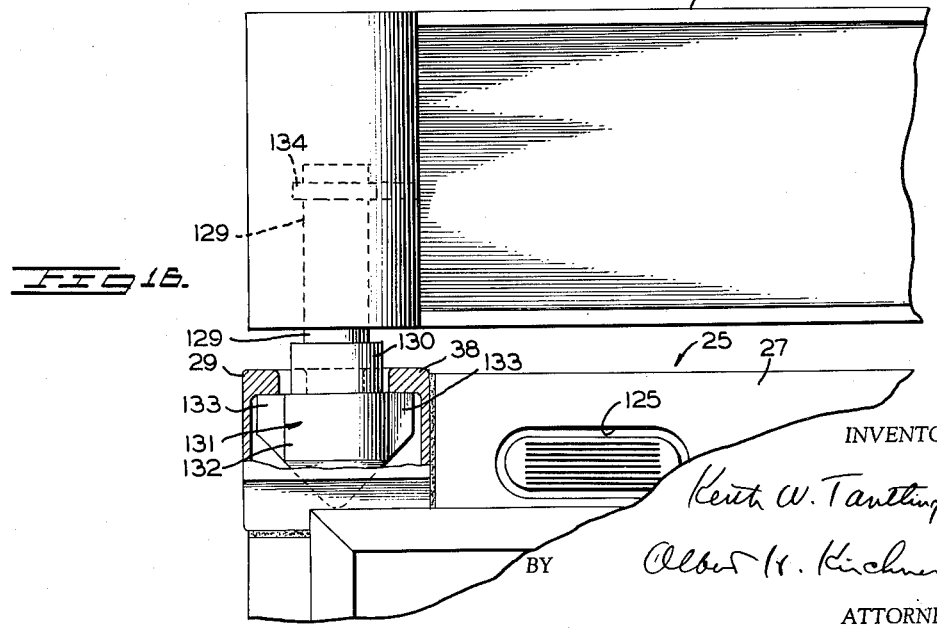
FIG. 18 is an enlarged fragmentary vertical sectional view of one end portion of a hatch cover or the like, showing the means associated therewith for interlocking a box thereto.

In FIGS. 17, 18 and 19 are shown the means for positioning and locking a box on a ship's hatch cover. In these figures the hatch cover of the ship is indicated by the numeral 136. The hatch cover 136 has arranged thereon a plurality of sets of plates 137, supported thereabove as at 138, the positions of each set of plates 137 corresponding to the four corners of a box to support the latter thereon. Each plate 137 rotatably supports an upstanding lug 139 generally similar to the lugs 131 previously described. Each lug 139 has a cylindrical central portion 140 provided with oppositely extending wing portions 141. The upper end of the cylindrical lug portion 141 is tapered to form a conical end 142, and the upper edges of the wings 141 form a continuation of such conical portion for a reason which will become apparent.

From the plate 137, a pair of upwardly and outwardly sloping cam surfaces 145 are fixed to the hatch cover 136. These cam surfaces are arranged at a 90° relationship, as shown in FIGS. 18 and 19, to engage the adjacent, intersecting sides forming one of the corner portions of a box lowered into position on the hatch cover. It will be apparent that the bottom extremities of the cam surfaces of each plate 137 of a set define the corner of a rectangle corresponding to the shape of the box and hence constitute guide means for directing the box from any misaligned position downwardly toward the plates 137 to position the bottom castings 28 of the box directly on the plates 137.

The box is lowered into position with the lugs 139 positioned to correspond to the shapes of the openings 40 in the bottom castings 28 and, accordingly, as the box is lowered, the lugs 140 will enter the corresponding openings 40. In the space beneath each plate 137, a handle 146 is connected to the associated lug 140 to rotate it between its two positions, and the lower end of each lug 140 is rotatable in a bearing 147 carried by the hatch cover 136. It will be apparent that as each lug 140 is engaged in its associated opening 40, the lug may be turned by the handle 146 to lock the box in position. The handle may be latched in its locking position by engagement of a keeper 146' in the form of a small plate (FIG. 19a) pivoted to one of the guide members 145 and adapted to be lowered to hook its free, slotted end over the end of the handle 146.

In FIGS. 20 and 21 there is shown a double-ended lug device whereby superimposed boxes may be positioned and locked with respect to each other as shown in FIG. 17. Each of the double-ended lugs is indicated as a whole by the numeral 150. Each such double lug device comprises a pair of horizontal plates 151 fixed in spaced parallel relation by vertical spacer members 152 preferably welded thereto. Each plate carries a bearing collar 153, shown in section in FIG. 21 for rotatably supporting a tubular member 154, the upper and lower ends of which are reduced to receive lug heads 155. The central portion of each lug head is cylindrical as at 156 (FIG. 20), and such portion of the lug is provided with a conical axial extremity 157. At diametrically opposite points each lug head is provided with extended wings 158, the edges of which toward the extremities of the lug device are sloped to form continuations of the conical ends 157 as shown in FIG. 21.

Between the plates 151 a handle 160 is secured to the tubular member 154 to rotate the latter to position the locking lugs relative to the openings 40 in which they are to be arranged. A locking pin 161 is slidable through the plates 151 to prevent movement of the handle 160 from its locked position as described below.

The plates 151 form bearing plates engageable with the adjacent faces of the castings 28, 29 of the boxes to be secured in position by the double-ended lug. Preferably, the wings 158 of the upper and lower lug heads are slightly offset circumferentially from each other, as shown in FIG. 20, for a purpose to be described. Preferably also a vertical abutment plate 152' is welded to one of the spacer members 152 to engage one of the sides of the container corner castings 28, 29 so as to prevent rotation of the entire lug device 150 when not loaded.

Various types of lug heads may be employed as shown in the drawings described and as shown, for example, in FIGS. 22–25. As shown in FIGS. 22 and 23, each casting 28, 29 may be provided with an elliptical opening 165 instead of an opening of the shape shown in FIG. 14 and described above. In such case, the lug body 166 employed in conjunction therewith will be tapered downwardly in all directions from a point and will correspond in cross sectional shape to the shape of the opening 165, the upper end of each lug body 166 being approximately equal in size to the opening 165 so as to be insertible therethrough for subsequent turning to the position shown in FIG. 23 to lock the lug to the casting 28, 29.

In FIGS. 24 and 25 the casting 28 is shown as being provided with an oblong opening 170, and the locking lug 171 will be similarly shaped in cross section throughout its height, being pyramidally tapered to decrease in width and depth toward its lower end. The upper end of the locking lug will be oblong in shape to correspond approximately to the size of the opening 170 so as to be insertible therethrough for subsequent turning to the position shown in FIG. 25 to lock the parts in position.

Figure 30:
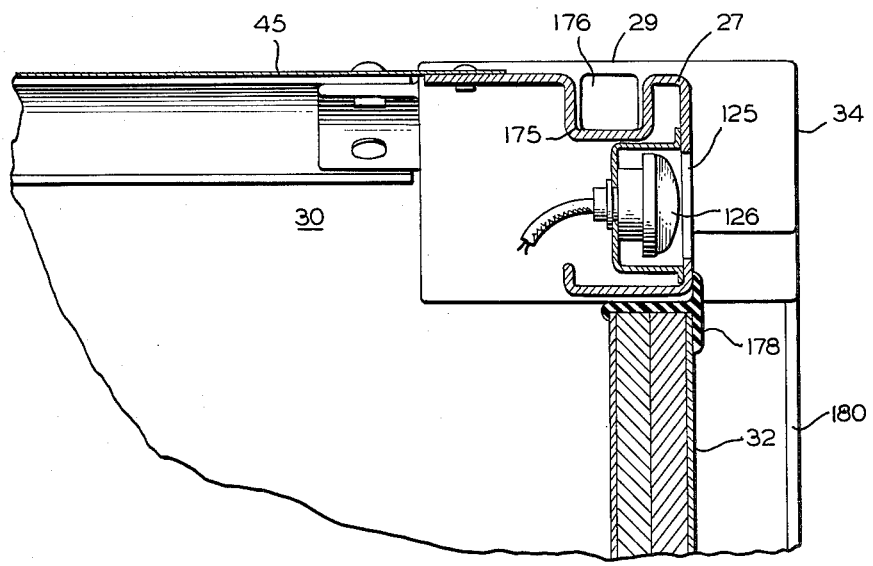
FIG. 30 is an enlarged fragmentary vertical cross sectional view through the roof and one of the rear doors of the box showing one of the recessed road lights.

The rear top frame member 27 is of generally channel shape, as shown in FIG. 30, and is provided with a trough 175 (see also FIG. 14), in its upper surface for catching rainwater draining from the roof sheet, which is discharged into the upper rear castings 29 through a port 176 and thence out through side openings 177 (FIG. 13). Thus the doors 32 and more particularly the doorway which they normally close are protected, especially when loading or unloading operations must be conducted during rainfall.

Further protection to the doorway is provided by suitable weatherstripping 178 (FIGS. 29 and 30) and, as shown in FIG. 29, the hinges 33 which mount the doors 32 are protected by integral flanges 180 formed by the rear corner posts 36 and extending rearwardly beyond the projection of the hinge leaves, being cut out, as shown at 181 in FIGS. 5 and 29, to expose the hinges for outward swinging movement of the doors.

FIGS. 28 and 29 show the cross sectional shape of the front and rear corner posts, from which it will be appreciated that the outer surfaces of these posts define the outermost vertical planes of the box as a whole, so as to cooperate with the cell-defining guide angles in the ship's hold for safe raising and lowering of the box, while the inner surfaces of the posts present a minimum of protuberance or projection into the interior of the box, thus enhancing the capacity of the box. These figures show also the vertical strengthening ribs 182 with which the side walls 30 of the box may be stiffened. These ribs, which are of conventional construction, arrangement and purpose, perform no load-bearing function. As has been stated among the objects of the invention at the beginning of this specification, the four corner posts, with their terminal castings 28, 29, constitute the structural columns which alone support the weight of superposed boxes, loaded or unloaded, in stacked relationship in the ship's hold, confined therein by the cell-defining guide angles, or in stacked relationship on the deck or hatch cover, where the boxes are laterally unconfined but have the juxtaposed top and bottom castings 28 and 29 of contiguous boxes connected by the double ended lug devices shown in FIGS. 20 and 21.

Throughout this specification the elements 28 and 29 are for convenience designated castings. In actual practice heavy ferrous metal castings have been used but of course the manner of manufacture of these elements forms no part of the invention and it is obvious that their function, which alone is vital to the inventive combination of which they form an important part, could as well be performed if they were made otherwise, as by forging, welded fabrication or in any other way. Use of the term castings in the appended claims is therefore intended to cover these elements without limitation to any manufacturing technique.

Operation

It will be assumed that a box is to be transferred from a trailer chassis to shipboard. The box will be mounted on the chassis as shown in FIG. 3, the various locking devices being in operation as further referred to below. The tractor-trailer vehicle will be driven into position on the pier roadway surface 11, whereupon an operator will pull the handles 115 downwardly, thus swinging the locking devices 110 out of engagement with the frame member 27. Similarly, the handles 102 (FIG. 10) will be swung inwardly to the positions shown in FIG. 9 to release the locking members 94. The box is now free to be lifted from the trailer chassis. An operator in the cab 21 will then effect movement of the bridge 14 to a position on the projecting jibs of the gantry 13 outwardly beyond the side of the ship, directly over the box, and will lower the crane 20 downwardly to the pick-up position. This operation will be carried out with the lug heads 131 positioned as shown in FIG. 15 to correspond to the arrangement of the openings 40 of the upper corner castings 28, 29, whereupon the lowering of the crane 20 will effect movement of the lug heads into the openings 40. The conical ends 132' assist the entry of the lug heads into position. When the lug heads reach the proper inserted position, the operating means 134 will be actuated to rotate the lug heads 90° to positions corresponding to that shown in FIG. 16, the wings 133 engaging beneath the top wall 138 of each upper casting 28, 29. The crane will then be operated to lift the box, as shown in FIGS. 1 and 2, free of the trailer chassis.

The crane operator will effect movement of the box to a position above the level of the deck 12 of the ship, whereupon the bridge 14 and gantry 13 will be operated to move the box laterally to whatever position may be desired. The box may be stowed in the hold of the ship or placed in position on a hatch cover.

If the box is to be lowered into the hold, the crane is stopped in its lateral movement with the box poised over an open hatch provided with vertical cells defined by corner guideways such as the angle iron structure disclosed in my copending application Serial No. 682,512 hereinabove referred to, and the box is thereupon lowered until it comes to rest in the bottom of the hold cell or on top of a box previously deposited therein. In either case superposition of the boxes on each other is greatly facilitated by that important feature of the box corner constructions by which the corner castings 28, 29 are so related to the corner posts and to the roofs and side and end walls of the boxes that the boxes may be stacked one on another with all the load taken by the corner castings and the corner posts. The castings project slightly beyond the roof and wall sheets, and slightly beyond the structural members 26 and 27. They are flush with, or very slightly inset from, the corner posts at the front, both sides and rear (see FIGS. 13, 14 and 16). Thus it is only these castings and corner posts that engage the cell-defining angle iron guides in the hold, and it is only the castings that engage each other and transmit the weight of an upper box to the corner posts of lower boxes when boxes are superposed in the hold.

If the box is to be stowed on the deck, as for example on a hatch cover equipped as heretofore described and shown in FIGS. 17, 18 and 19, the crane operator will effect movement of the box to a position above a set of the lug heads 139, with the openings 40 in the lower castings 28, 29 approximately positioned over the respective lug heads 142. With the wings 141 of these heads turned to positions corresponding to the positions of the openings 40 in the lower castings 28, 29, the crane will lower the box into position. The bottom walls of the lower castings 28 will rest on the respective plates 137, whereupon the handles 146 will be turned to lock the lugs relative to the castings in the same manner described in connection with FIG. 16. The lugs 131 (FIGS. 15 and 16) carried by the crane frame 20 for lifting the box and depositing it in the position referred to will now be released by again turning the lug heads 131 to positions corresponding to the openings 40 in the upper castings 28, 29. The frame 20 may then be raised and may be utilized in the same manner as above for lifting a box from another trailer chassis moved in position as before.

Assuming that two of the boxes are to be superimposed as shown in FIG. 17, the second box picked up will be moved in the manner described above to a position above the previously deposited box. Prior to the lowering of the second box, four of the double-ended lugs shown in FIGS. 20 and 21 will be set for blocking and supporting the two boxes in position with respect to each other. One of the double-lugged devices 150 will be positioned at each top corner of the previously deposited box and, with the lower lugs 155 properly positioned for such purpose, they will be inserted into the respective openings 40 of the upper castings 28, 29. Such lower lugs then may be slightly turned, for example as suggested by the lower lug in FIG. 20, sufficiently to move the wings 158 out of alignment with the lateral extensions of the openings 40 in which they have been inserted, and this operation will prevent displacement of the lower lugs of the devices 150 from the top of the previously placed box. It is for this purpose that the upper and lower lugs 155 of each double-ended device are slightly misaligned as shown in FIG. 20. With the lower lug turned sufficiently to lock it in position, the upper lug of each device may be positioned to enter the opening 40 of the lower casting 28, 29 at one corner of the second box being lowered into position. The pin 161 may be removed, whereupon the upper box may be deposited in position as will be apparent, the upper lugs 155 entering the openings 40 in the lower castings 28, 29 until such castings rest on the upper plate 151. The handle 160 then may be swung to the right of the position shown in FIG. 20 to move both ends of the double lug device to locked position, whereupon the pin 161 may be reinserted to prevent accidental movement of the handle to a position unlocking either of the lugs.

Assuming now that a trailer chassis is to be loaded with one of the boxes, for example by transferring a box from a ship at dockside, the operator will control the bridge 14 and gantry 13 to pick up one of the boxes from the ship in exactly the same manner as such box was picked up from the trailer chassis as described above, so far as the operation of the pick-up lugs is concerned. A description of such operation need not be repeated. The box will be picked up, moved to a position over a previously placed empty trailer chassis and lowered toward a loading position. The various locking devices 94 and 110 will be in unlocked position during the lowering of the box on the trailer chassis.

The box will be lowered, for example as suggested in FIG. 9, and as it approaches the trailer chassis any misalignment of the box relative to the chassis will be corrected by engagement of the flanges 73 with the cam surfaces 72, thus assisting in positioning the box relative to the trailer chassis. Toward the forward end of the chassis, the structural members 61 (FIG. 8) will be engageable with the downwardly and outwardly sloping surfaces of the structural members 50 to assist in laterally positioning the forward end of the box.

Referring to FIG. 12, it will be noted that if the box is slightly offset rearwardly of its proper position relative to the chassis, the channel member 70 will engage the cam surface 68 and will slide forwardly thereover to its proper position. If the box is misaligned longitudinally of the chassis in the opposite direction, the structural members 27 (FIG. 6) will be engageable with the cam surface 86 to be moved rearwardly thereby to proper position. As soon as the box has been deposited on the chassis, the handles 115 (FIGS. 6 and 7) will be swung upwardly to engage the locking members 110 with the structural member 27 as shown in FIG. 6. The handles 102 will be swung from the unlocked position shown in FIG. 9 outwardly to the locked positions shown in FIG. 10, thus engaging the locking members 94 with the flanges 73. In each case, the pivotal connection of the links of the locking devices with the bell crank levers will move to over-center positions as shown in FIG. 11 and will be biased to such positions by the spring 103, thus firmly maintaining the parts in locked positions and fixing the box relative to the chassis. The pick-up lugs 131 (FIGS. 15 and 16) may then be rotated 90° to release them from the upper castings 28, 29, whereupon the lifting frame 20 may be raised and the trailer may be pulled away by its tractor.

From the foregoing it is believed to be apparent that the present invention provides a highly efficient system by which trailer bodies may be employed as shipping boxes or containers and wherein such boxes may be transferred to shipboard without unloading, transferring and packing on the ship the freight contained in the boxes. These boxes may be packed with substantially any kind of shipable merchandise, for example at a factory, and the boxes need not be opened and unloaded until the distributing point at the final destination is reached. Having been packed at the factory, the boxes may be conveyed overland to the ship's side, transferred to the ship, and secured in position in the hold or on the deck for marine transportation to a port of destination. When such destination is reached, the reverse procedure may be resorted to, similar unloading means being employed for transferring the boxes from the ship to similar trailer chassis to be transferred thereby to the ultimate destination. Only then need the boxes be opened and unloaded. Obviously, much handling of freight is eliminated with the present construction, resulting in very much lowered shipping cost and eliminating damage due to the repeated handling of individual shipped articles.

The particular cross sectional shape of the lugs is of no critical importance so long as these lugs are non-circular and have larger ends corresponding in shape to the socket openings, and so long as the lugs taper toward their free ends to facilitate their insertion into the socket openings.

An incidental advantage of the chassis "horn" formed by the front wall 83 and the rear cam surface 86, best shown in FIGS. 6 and 7, for assisting in aligning the box on the chassis, is that it provides a protective mounting for the necessary "gladhands," electrical receptacles and any other conduits and connectors required between the tractor and the trailer. In the interest of simplicity and clarity of disclosure, the tractor is not shown in the drawings, but it will be understood that this vehicle is provided with the customary fifth wheel which cooperates with a king-pin, such as is shown at 80 in FIG. 7, depending from a skid plate on the chassis. Heretofore the fifth wheel, advancing toward the chassis, has frequently damaged the gladhands projecting directly from the chassis frame. In the new construction the front surface 83 of the aligning horn provides a mounting for gladhands 201, electrical connectings 202, etc., as shown in FIG. 7, which renders them immune from damage by the fifth wheel and any other part of the tractor.

I claim:

1. Freight handling apparatus comprising a vehicle chassis and a box adapted to rest thereon, hoisting means for raising and lowering the box relative to the chassis including hoisting lugs and means carried by the top of the box for interlocking engagement by said lugs, said chassis and said box having portions interengageable with each other as the box is lowered to a position in engagement with the chassis, said interengageable portions diverging upwardly whereby engagement of said portions as the box approaches a position on the chassis will guide said box to a position in predetermined relation to said chassis and comprising a lock engaging element carried by said box and a structural member carried by said chassis, said structural member extending transversely of the chassis and having upwardly converging end surfaces engageable by said lock engaging element as the box is lowered into position on said structural member to guide said box into position relative to said chassis, and locking means carried by said structural member and engageable with said lock engaging element, said locking means comprising a locking element mounted for turning movement on a fixed pivot carried by said structural member and having a locking portion spaced from said fixed pivot and engageable with said lock engaging element, a link pivotally connected at one end to said locking element at a point spaced from said fixed pivot and from said locking portion, a bell crank lever pivoted with respect to said structural member and having one arm constituting an operating lever, a pivot pin connecting the other end of said link to the other arm of said bell crank lever whereby swinging movement of said lever will swing said locking element between locked and unlocked positions, the pivot pin connected to said other end of said link being movable across a plane between the pivot at said one end of said link and the pivot of said bell crank lever, and a spring biasing said locking element for turning movement in a direction tending to move the pivot of said one end of said link toward the pivot of said bell crank lever.

2. Freight handling apparatus comprising a vehicle chassis and a box adapted to rest thereon, hoisting means for raising and lowering the box relative to the chassis including hoisting lugs and means carried by the top of the box for interlocking engagement by said lugs, said chassis and said box having portions interengageable with each other as the box is lowered to a position in engagement with the chassis, said interengageable portions diverging upwardly whereby engagement of said portions as the box approaches a position on the chassis will guide said box to a position in predetermined relation to said chassis and comprising a lock engaging element carried by said box and a structural member carried by said chassis having upwardly converging surfaces engageable by said lock engaging element as the box is lowered into position on said structural member to guide said box into position relative to said chassis, and locking means carried by said structural member and engageable with said lock engaging element, said locking means comprising a locking element pivoted on said structural member and having a locking portion engageable with said lock engaging element, a link pivotally connected at one end to said locking element at a point spaced from its pivot and from said locking portion, a bell crank lever pivoted with respect to said structural member and having one arm constituting an operating lever, and a pivot pin connecting the other end of said link to the other arm of said bell crank lever whereby swinging movement of said lever will swing said locking element between locked and unlocked positions.

3. Freight handling apparatus comprising a vehicle chassis and a box adapted to rest thereon, hoisting means for raising and lowering the box relative to the chassis including hoisting lugs and means carried by the top of the box for interlocking engagement by said lugs, said chassis and said box having portions interengageable with each other as the box is lowered to a position in engagement with the chassis, said interengageable portions diverging upwardly whereby engagement of said portions as the box approaches a position on the chassis will guide said box to a position in predetermined relation to said chassis and comprising a lock engaging element carried by said box and a structural member carried by said chassis having upwardly converging surfaces carried by said chassis and locking means comprising a locking element pivoted on the structural member of the chassis and having a locking portion engageable by the lock engaging element of the box, and manually operable actuating means for said locking element comprising a bell crank lever pivoted on the chassis and having a long operating handle arm and a short arm, a link having one end pivoted to the locking element and its other end pivoted to the short arm of the bell crank lever, and spring means normally biasing the short arm and link to a position beyond dead center with the locking element engaged with the lock engaging element, thereby securing the box to the chassis.

4. Freight handling apparatus comprising a vehicle chassis and a box adapted to be engaged therewith and be detachably secured thereto, said chassis comprising spaced longitudinal side frame members having their forward portions upwardly offset, longitudinally spaced front and rear cross members connecting the side frame members, said rear cross member having a downwardly and forwardly sloping front wall surface and at least one of said cross members having downwardly and outwardly sloping end surfaces, and said front cross member having a downwardly and rearwardly sloping rear wall surface, said box having its under side provided with a downwardly open well receiving the upwardly offset forward portions of the side frame members of the chassis and having frame members adapted to engage said sloping surfaces of the chassis frame members and be guided thereby into engagement with the chassis when the box is lowered onto the chassis, and interlocking means in at least some of said chassis frame members projectible through openings in the sloping walls thereof for locking engagement with adjacent portions of the box for detachably securing the box to the chassis.

5. Freight handling apparatus as claimed in claim 4, in which the under side of the box is provided with longitudinally spaced transverse structural members adapted to fit down onto the side frame members of the chassis on opposite sides of the rear cross member of the chassis.

6. Freight handling apparatus as claimed in claim 4, in which the interlocking means includes manually operable actuating handles carried by the chassis.

7. Freight handling apparatus as claimed in claim 4, in which the interlocking means includes a locking plate pivoted on the chassis, a keeper element formed on the box, and toggle linkage provided on the chassis and movable past dead center to hold the locking plate in locking engagement with the keeper element.

References Cited in the file of this patent

UNITED STATES PATENTS

| | | |
|---|---|---|
| 895,278 | Lettinger | Aug. 4, 1908 |
| 1,403,568 | Rodowicz | Jan. 17, 1922 |
| 1,437,964 | Fitch | Dec. 5, 1922 |
| 1,448,311 | Miller | Mar. 13, 1923 |
| 1,478,269 | Travis | Dec. 18, 1923 |
| 1,583,319 | Smith | May 4, 1926 |
| 1,900,867 | Olds | Mar. 7, 1933 |
| 1,940,242 | Burgess | Dec. 19, 1933 |
| 2,111,162 | Woodruff | Mar. 15, 1938 |
| 2,251,839 | Dondlinger | Aug. 5, 1941 |
| 2,337,200 | Huntley | Dec. 21, 1943 |
| 2,424,429 | Bamberg | July 22, 1947 |
| 2,427,603 | Higgins | Sept. 16, 1947 |
| 2,457,841 | Smith et al. | Jan. 4, 1949 |
| 2,613,836 | Newhall et al. | Oct. 14, 1952 |
| 2,660,319 | Dorland | Nov. 24, 1953 |
| 2,670,859 | Zeckendorf et al. | Mar. 2, 1954 |